US012531753B2

(12) United States Patent
Tian et al.

(10) Patent No.: US 12,531,753 B2
(45) Date of Patent: Jan. 20, 2026

(54) SECURE ENCLAVE ENVIRONMENT OF BLOCKCHAIN ORACLE

(71) Applicant: Ava Labs Inc., New York, NY (US)

(72) Inventors: Michelle Sichun Tian, New York, NY (US); Michael Edmond Kaplan, Brooklyn, NY (US); Bernard Wong, Waterloo, CA (US)

(73) Assignee: Ava Labs, Inc., New York, NY (US)

( * ) Notice: Subject to any disclaimer, the term of this patent is extended or adjusted under 35 U.S.C. 154(b) by 16 days.

(21) Appl. No.: 18/793,116

(22) Filed: Aug. 2, 2024

(65) Prior Publication Data

US 2025/0047514 A1    Feb. 6, 2025

Related U.S. Application Data

(60) Provisional application No. 63/517,282, filed on Aug. 2, 2023.

(51) Int. Cl.
*H04L 9/40* (2022.01)
*H04L 9/00* (2022.01)
*H04L 9/32* (2006.01)

(52) U.S. Cl.
CPC .............. *H04L 9/40* (2022.05); *H04L 9/3271* (2013.01); *H04L 9/50* (2022.05)

(58) Field of Classification Search
CPC . H04L 9/40; H04L 9/50; H04L 9/3239; H04L 9/3271
See application file for complete search history.

(56) References Cited

U.S. PATENT DOCUMENTS

| | | | | |
|---|---|---|---|---|
| 11,496,327 B1 * | 11/2022 | Kaplan | ................... | G06Q 20/02 |
| 11,538,027 B1 * | 12/2022 | Kaplan | ................... | G06Q 20/36 |
| 11,836,714 B2 * | 12/2023 | Kaplan | .............. | G06Q 20/3676 |
| 11,985,262 B2 * | 5/2024 | Kaplan | ..................... | H04L 9/14 |
| 12,323,540 B2 * | 6/2025 | Kaplan | .............. | G06Q 20/3825 |
| 2010/0281178 A1 * | 11/2010 | Sullivan | ............. | H04N 21/2668 |
| | | | | 709/245 |
| 2017/0352027 A1 | 12/2017 | Zhang et al. | | |

(Continued)

OTHER PUBLICATIONS

Leary, Conor, "Avalanche Bridge: Secure Cross-Chain Asset Transfers Using Intel SGX," published in Avalanche Blog on Aug. 5, 2021, accessed at https://medium.com/avalancheavax/avalanche-bridge-secure-cross-chain-asset-transfers-using-intel-sgx-b04f5a4c7ad1 on Aug. 5, 2024, 13 pages.

(Continued)

*Primary Examiner* — Dhairya A Patel
(74) *Attorney, Agent, or Firm* — Barnes & Thornburg LLP

(57) ABSTRACT

Described herein are systems and methods for providing trustworthy consensus information based on data from distributed data sources. An oracle program can be executed by processors in a secure execution environment, and can interact with a pool of warden servers of a blockchain to determine the trustworthy consensus information. The oracle can perform operations including providing requests for off-chain to the warden servers, receiving off-chain data values from the warden servers, and determining reliable consensus information from the received off-chain data values. The reliable consensus information can be provided to a computing device that is external to the secure execution environment.

22 Claims, 10 Drawing Sheets

(56) References Cited

U.S. PATENT DOCUMENTS

| | | | | |
|---|---|---|---|---|
| 2018/0331835 A1* | 11/2018 | Jackson | ................ | H04L 9/3297 |
| 2020/0204346 A1* | 6/2020 | Trevethan | ............. | H04L 9/3271 |
| 2022/0038339 A1* | 2/2022 | Taguchi | ................ | H04L 67/10 |
| 2023/0134458 A1 | 5/2023 | Kaplan et al. | | |
| 2024/0007284 A1* | 1/2024 | Osborn | ................ | G06F 16/164 |
| 2024/0370865 A1* | 11/2024 | Bernardi | ................ | G06Q 20/36 |
| 2025/0094974 A1* | 3/2025 | Ohtamaa | ................ | G06Q 40/04 |

OTHER PUBLICATIONS

Huang, et al., "Defending data poisoning attack via trusted platform module and blockchain oracle," In ICC 2022-IEEE International Conference on Communications May 1, 20226 (pp. 1245-1250).

Huang C, et al., "Repchain: A reputation-based secure, fast, and high incentive blockchain system via sharding," IEEE Internet of Things Journal, 15.03.2021; 8(6):4291-304.

International Search Report and Written Opinion in PCT/US2024/040773, dated Oct. 4, 2024, 18 pages.

\* cited by examiner

SECURE ENCLAVE ENVIRONMENT OF BLOCKCHAIN ORACLE

CROSS-REFERENCE TO RELATED APPLICATIONS

This application claims the benefit of priority of U.S. Provisional Patent Application No. 63/517,282, filed Aug. 2, 2023, the entirety of which is incorporated herein by reference.

TECHNICAL FIELD

This document generally describes devices, systems, and methods related to providing a blockchain oracle that uses a secure enclave environment to evaluate data received from various sources and to provide trustworthy consensus information based on the received data.

BACKGROUND

Various secure computing environments have been developed, which can protect various aspects of processes within the secure computing environments from observation, detection, or manipulation by third party actors (e.g., malware). For example, secure computing enclaves have been developed that include hardware components of computing devices that provide operations to execute code in an encrypted environment that can shield the operations and/or data being processed from third party actors. For instance, a computing device can include one or more specialized processors that are configured to allow user-level and/or operating system code to define private and encrypted regions of memory, sometimes called enclaves.

In general, blockchain oracles are services that connect smart contracts executed by blockchain nodes with off-chain sources of data. Blockchain oracles can query, verify, and authenticate the off-chain data sources, and can relay information for use by the smart contracts. Centralized oracles can be managed by a single entity, whereas decentralized oracles can incorporate multiple data sources.

SUMMARY

The document relates to secure and trustworthy oracles that can provide consensus information based on data received from distributed sources. The disclosed technology provides for a blockchain oracle (or another sort of information oracle that provides off-chain information about the outside world) that is executed within a secure execution environment (e.g., an enclave). The blockchain oracle, for example, can interact with a pool of warden servers, with each warden server being configured to collect data from one or more data sources that provide data from outside of the blockchain. The blockchain oracle can receive the data from the wardens, and can determine reliable consensus information based on the received data. After determining the reliable consensus information, for example, the blockchain oracle can provide the information to the blockchain (e.g., to one or more blockchain nodes executing a smart contract), or another sort of computing device that consumes information provided by the oracle. Remote attestation techniques can be used (e.g., by the wardens, by the blockchain nodes, and/or by other attestation devices) to validate that the oracle program being executed in the secure execution environment is authentic and unmodified, thus establishing trust within the system. Also, as a distributed system, with multiple different wardens collecting data (possibly from multiple different data sources) and providing the collected data for use by the oracle in determining reliable consensus information, the system can prevent a deceptive entity from influencing the oracle through control of a warden and/or data source.

Techniques that can be used within the distributed system to determine reliable consensus information include synchronous processes in which the blockchain oracle directs the operations of the wardens, and/or asynchronous processes in which the wardens operate relatively independently of the oracle and each other. In general, reliable consensus information can be determined by the oracle when data has been received from a threshold number of wardens, and when the received information is in accordance. Metrics related to the timeliness and/or reliability of the wardens can be tracked, with wardens having positive metrics possibly being rewarded (e.g., through the provision of blockchain tokens or another sort of reward), and with wardens having negative metrics possibly being replaced by other wardens.

The disclosed technology provides oracles through a trustless yet secure computing environment, such as an enclave. Because the enclave is trustless and secure, the oracle may not be exploited by an operator of the enclave and/or oracle, nor may the oracle be exploited by third party actors or malicious entities. The determination and provision of reliable consensus information by the oracle can occur privately and securely within the enclave running the oracle. The secure enclave of the oracle can be verified via remote attestation by one or more third party actors to ensure that the code loaded into and run to provide the oracle is valid and secure. For example, one or more adjudicators (e.g., one or more of the warden servers) can be anonymous nodes that are tasked with verifying that the oracle code running in the enclave is valid and unaltered from a verified version of the oracle code. One or more other entities, such as devices that consume information provided by the oracle, can also perform remote attestation of the oracle and/or request that the adjudicators perform remote attestation.

One or more embodiments described herein can include a system for providing trustworthy consensus information based on data from distributed data sources, the system comprising: a secure execution server comprising one or more processors and memory, the memory storing an oracle program, wherein the one or more processors and the memory provide a secure execution environment that, when the oracle program is executed by the one or more processors in the secure execution environment, is configured to interact with a pool of warden servers to determine trustworthy consensus information, the oracle program comprising instructions stored in the memory that, when executed by the secure execution environment, cause the secure-execution server to perform operations comprising: providing, to each warden of a group of wardens, a respective request for off-chain data; after providing the requests for off-chain data, receiving, from one or more wardens of the group of wardens, one or more off-chain data values that correspond to the requests for off-chain data; after a designated time window has elapsed for receiving off-chain data from wardens of the group of wardens, determining a number of wardens from which the one or more off-chain data values have been received; in response to determining that the number of wardens meets a threshold number of wardens, determining reliable consensus information from the one or more off-chain data values that have been received from wardens of the group of wardens; and providing the reliable consensus information to a computing device that is external to the secure execution environment.

In some implementations, the embodiments described herein can optionally include one or more of the following features. For example, the operations can further comprise receiving, from the computing device that is external to the secure execution environment, a request for reliable consensus information. The respective requests for off-chain data can be provided to each warden of the group of wardens in response to receiving the request for the reliable consensus information. The computing device that is external to the secure execution environment can be a node in a blockchain network that is executing a smart contract. The respective requests for off-chain data can be provided to each warden of the group of wardens in response to a periodic event received from a system timer. The respective requests for off-chain data can be provided to each warden substantially simultaneously. The respective requests for off-chain data can each specify one or more same data sources from which each warden is to collect off-chain data. Each warden can be configured to execute the same data collection code. Determining the reliable consensus information can be performed in response to determining that a sufficient number of the one or more off-chain data values received from wardens of the group of wardens are in conformance. Determining the reliable consensus information can include determining outlier values from among the one or more off-chain data values received from wardens of the group of wardens, and discarding the outlier values. The operations can further comprise removing, from the group of wardens, one or more wardens that have provided the outlier values. At least a portion of the one or more off-chain data values are received directly by the secure-execution server from one or more external data sources. The operations can further comprise generating and providing, in response to a remote attestation challenge, one or more validation values generated based on at least a portion of the oracle program stored in the memory of the secure execution server. The one or more validation values can be used by another computing device to validate that the oracle program is authentic and unmodified.

One or more embodiments described herein can include a system for providing trustworthy consensus information based on data from distributed data sources, the system comprising: a secure execution server comprising one or more processors and memory, the memory storing an oracle program, wherein the one or more processors and the memory provide a secure execution environment that, when the oracle program is executed by the one or more processors in the secure execution environment, is configured to interact with a pool of warden servers to determine trustworthy consensus information, the oracle program comprising instructions stored in the memory that, when executed by the secure execution environment, cause the secure-execution server to perform operations comprising: asynchronously receiving, from wardens of a group of wardens, one or more off-chain data values that have been collected by each of the wardens from one or more off-chain data sources; after receiving each of the off-chain data values from each of the wardens, storing the off-chain data values received from the warden; determining reliable consensus information from the stored off-chain data values, by (i) determining a number of active wardens from which off-chain data values have been received, and (ii) in response to determining that the number of active wardens meets a threshold number of wardens, determining reliable consensus information from the stored off-chain data values that have been received from the active wardens; and providing the reliable consensus information to a computing device that is external to the secure execution environment.

In some implementations, the embodiments described herein can optionally include one or more of the following features. For example, the off-chain data values that have been collected by each of the wardens can be received from each warden of the group of wardens in a common data format that is used by the secure execution server for receiving data. At least two of the wardens can be configured to collect off-chain data values from different data sources. The at least two of the wardens can be configured to execute different data collection code. Each warden of the group of wardens can be configured to provide an updated off-chain data value in response to detecting a change in the off-chain data value. Determining reliable consensus information can be performed in response to receiving the updated off-chain data value from a given warden. Determining reliable consensus information can be repeatedly performed at periodic intervals, independently of a request for the reliable consensus information. The operations can further comprise receiving, from the computing device that is external to the secure execution environment, a request for reliable consensus information. Determining reliable consensus information can be performed in response to receiving the request. The operations can further comprise providing, to each warden of the group of wardens, a respective request to resend the most recently collected off-chain data, and after providing the requests to resend the most recently collected off-chain data, receiving, from one or more wardens of the group of wardens, one or more off-chain data values that correspond to the requests. The operations can further comprise, for each warden of the group of wardens, tracking a corresponding reliability metric, by (i) assigning a positive metric value to a given warden when the warden has provided, sooner than other wardens, an off-chain data value that is later determined as reliable consensus information. At least a portion of the one or more off-chain data values are received directly by the secure-execution server from one or more external data sources. The operations can further comprise generating and providing, in response to a remote attestation challenge, one or more validation values generated based on at least a portion of the oracle program stored in the memory of the secure execution server, wherein the one or more validation values are used by another computing device to validate that the oracle program is authentic and unmodified.

Other implementations of these aspect include corresponding methods, and include corresponding apparatus and computer programs recorded on one or more computer storage devices, to perform the operations of the oracle program. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The devices, system, and techniques described herein may provide one or more of the following advantages. An information oracle (e.g., a blockchain oracle) can use a consensus algorithm to provide verified information, based on data that has been collected and provided by various distributed data sources. Since the consensus algorithm is executed in a remotely attestable secure enclave environment of the oracle, information consumers can be assured that the techniques being used to verify the information are correct and that the information is trustworthy. Off-chain data can be received from multiple different wardens, and the consensus algorithm can ensure that no single warden (or small group of coordinated wardens) can deceive the oracle. The consensus algorithm can base its analysis of received off-chain data on an appropriately-sized data sample to improve data reliability. Techniques for communicating with the wardens can be flexibly adapted to account for changing network conditions. Techniques for determining verified information can include techniques for conserving processing resources and/or network bandwidth.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document relates to a blockchain oracle (or another sort of information oracle that provides off-chain information about the outside world) that uses a secure enclave environment to provide trustworthy consensus information based on data received from various distributed data sources. The oracle can communicate with a pool of warden servers. Each warden server can collect data from various external data sources, and can then provide the collected data to the oracle. The oracle can determine reliable consensus information based on data received from the wardens. After determining the reliable consensus information, the oracle can provide the information to a computing device that uses information provided by the oracle (e.g., one or more blockchain notes executing a smart contract). Remote attestation techniques can be used to validate that the oracle program being executed in the secure execution environment is authentic and unmodified, thus establishing trust within the system. Since multiple different wardens collect data (possibly from multiple different data sources) and provide the collected data for use by the oracle in determining reliable consensus information, the system is advantageously distributed, and can prevent a deceptive entity from influencing the oracle through control of a warden and/or data source.

Figure 1:
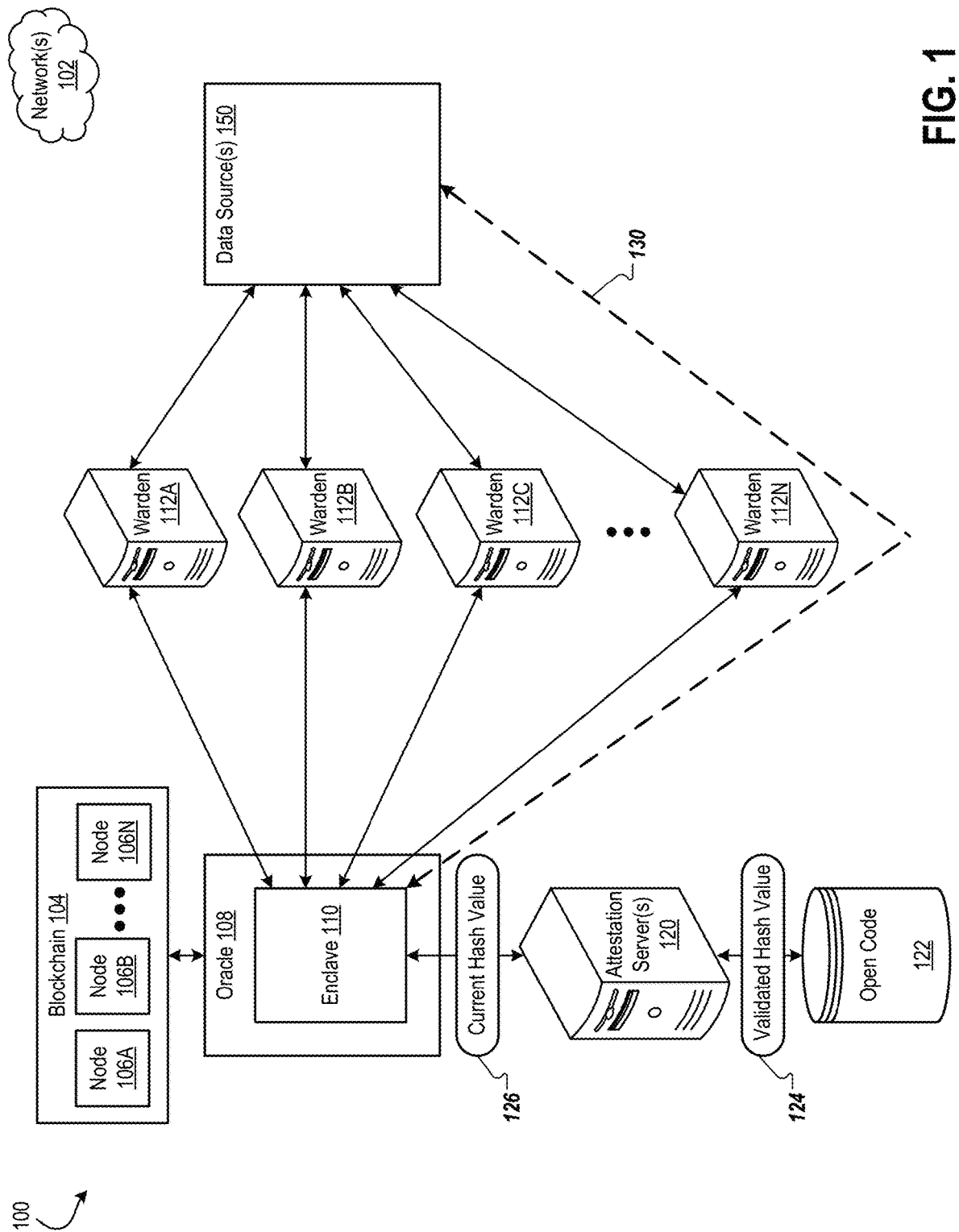
FIG. 1 is a conceptual diagram of a blockchain oracle that uses a secure enclave environment to provide trustworthy consensus information based on data provided by distributed sources.

Referring to the figures, FIG. 1 is a conceptual diagram of a secure enclave environment 100 of an information oracle 108 that provides trustworthy consensus information. The oracle 108 can communicate with a blockchain 104 via network(s) 102. The blockchain 104 can include a plurality of anonymous nodes 106A-N that run the blockchain. Each of the nodes 106A-N can communicate with each other and perform one or more operations in the blockchain 104. For example, the nodes 106A-N can execute smart contracts on the blockchain 104, can transfer tokens between wallets on the blockchain 104, and/or can perform other blockchain operations.

The oracle 108 can determine and provide information based on off-chain data to the blockchain 104. Smart contracts executed by the nodes 106A-N of the blockchain 104 can access the off-chain information provided by the oracle 108 and can use the information during execution to provide functionality that depends on the outside world. In general, determining information about off-chain data is a complex problem, since data values can change over time, and the sources of the data can be inconsistent and sometimes erroneous. Such off-chain data generally cannot be directly verified by a blockchain network, since the validity of the data cannot be determined by analyzing the data's on-chain state. Instead, data validity can be determined by the oracle 108, based on data received from various distributed data sources (e.g., wardens 112A-N that independently query or otherwise receive data from one or more data source(s) 150), and based on a consensus algorithm executed by the oracle 108 that analyzes the data. Since the consensus algorithm is executed by the oracle 108 in a secure enclave environment, consumers of information provided by the oracle 108 can be assured that the oracle's techniques for determining the information are correct, and that the information provided by the oracle 108 is trustworthy.

The secure enclave environment 100 can include both a trusted and an untrusted codebase. The trusted codebase can be a portion of the codebase that runs within an enclave 110 of the oracle 108, and the untrusted code can run outside of the enclave 110. The untrusted code, for example, can be responsible for initializing and starting the enclave 110 as well as executing remote attestation of the enclave 110. As part of attestation, the enclave 110 can prove its identity, that its source code has not been tampered with, and that the enclave 110 is running on a genuine enabled platform with the latest security updates.

The secure enclave 110 of the oracle 108 can be a secure computing environment that is operated on a server, computing system, and/or network of servers and/or computing systems. The enclave 110 can be stateless and constantly changing. The secure environment can be run by an operator. The operator can be anonymous. The enclave 110, when launched by the operator, can be verified using remote attestation to ensure that the correct and secure code is being run by the correct operator. If, for example, the enclave 110 fails to execute, wardens 112A-N may independently of each other determine whether the oracle 108 is responsive. Then, collectively, the wardens 112A-N can contact the operator of the enclave 110 and notify the operator that the oracle 108 is not executing. Sometimes, the operator can shut down the enclave 110 or otherwise terminate execution of the enclave 110. In such scenarios, the wardens 112A-N can collectively select another entity to become the operator of the enclave 110. In some implementations, the operator can be any one of the wardens 112A-N or any other entity operating within the secure enclave environment 100. When a new operator is selected, the wardens 112A-N can use their private shares of a master secret key for the enclave 110 in order to reassemble the master secret key that would be used by the operator to run the same code but in a new enclave. Thus, the transactions and activity from the enclave 110 can resume as if the enclave 110 never went down and a new operator was not selected.

Private keys for addresses used by the enclave 110 on the blockchain 104 can be derived from a single master secret key. The master secret key can be securely kept within the enclave 110. The master secret key can be split into shares using secret sharing techniques and distributed wardens 112A-N. The secret shares can be transmitted through transport layer security (TLS) and/or remote attestation. On restart, the enclave 110 can, for example, fetch K of N shares of the master secret key from the wardens 112A-N to recompute the master secret key. The master secret key can then be used to rederive the private keys for a blockchain 104 address, which can be used to hold assets or tokens, and/or to deploy smart contracts on the blockchain 104.

The wardens 112A-N included in the secure enclave environment 100 can be remote servers or other computing systems that are trusted partners of the enclave 110. The wardens 112A-N can be anonymous and in communication with the enclave 110 and the blockchain 104. The wardens 112A-N can monitor the blockchain 104 for on-chain events, such as transferring tokens between blockchain wallets. The wardens 112A-N can verify such on-chain events and can broadcast instructions to execute the on-chain events at the blockchain. The wardens 112A-N can also access data provided various data source(s) 150. The data source(s) 150, for example, can be servers, websites, exchanges, directories, physical sensors, or other sources of off-chain data that are independent from the wardens 112A-N and that are not under the control of any of the wardens 112A-N. Gathering data from the data source(s) 150, for example, can include polling for the data (e.g., scraping a website, submitting a data request through a server's application programming interface (API), etc.), and/or can include monitoring communication channels for incoming data (e.g., waiting for pushed data). As another example, the data source(s) 150 can be integrated with and/or under the control of the wardens 112A-N. For example, each of the wardens 112A-N can include (and/or can control) a respective data collection device (e.g., a physical sensor, an Internet of Things (IoT) device, or another sort of data collection device) that is configured to independently collect real-world data (e.g., weather-related data, traffic congestion data, etc.). As another example, the data source(s) 150 can include data that has been manually input by operators of the wardens 112A-N.

When the enclave 110 of the oracle 108 is initiated, the enclave 110 can boot up with a configuration file. The configuration file can be a secure codebase that is used by an operator to establish the enclave 110. The configuration file can include information such as addresses and/or domains that identify the wardens 112A-N that will communicate with the enclave 110 of the oracle 108. The configuration file can also include instructions for generating a master secret key for the enclave 110. The master secret key can be a cryptographically secure random key. All other private keys and other secret values can be deterministically derived from this master secret key. The master secret key can be used to derive private keys that can be used by the enclave 110 to encrypt and decrypt instructions. The master secret key can also be used to boot up the enclave 110 if execution of the enclave 110 has terminated. The master secret key can also be used to establish a new enclave that can continue performing the transactions of the prior enclave.

The enclave 110 can add a checksum to the master secret key when it is generated. Adding the checksum can be advantageous to resolve potential situations in which the enclave 110 makes a request to a warden to get its secret share and the warden is unable to verify that the request originated from within a valid enclave. In such situations, an operator of the enclave can maliciously collect secret shares from each warden. Similarly, an operator can maliciously set secret shares that they generated outside of the enclave 110 since the wardens may not know if the setting request properly came from the enclave 110. Also, a single malicious warden can provide an incorrect secret share. Adding the checksum to the master secret key can resolve these situations. For example, after generating the master secret key, the value of the key will be random and followed by a last 4 bytes of a SHA256 hash of the key. This way, the enclave 110 can immediately check if the master secret key it regenerates using the secret shares from the wardens 112A-N is correct. If the checksum does not match, then the enclave 110 can try to regenerate the master secret key using a different group of the secret shares that it obtains from the wardens 112A-N. In some implementations, any group of a secret share threshold from a total number of the secret shares can be used to regenerate the master secret key.

The enclave 110 can also identify which entities will be acting as the wardens 112A-N. For example, the configuration file can include addresses, domains, or other identifiers that can be used to identify the entities that have been chosen as the wardens 112A-N. The enclave 110 can then verify the wardens 112A-N. Verifying the wardens 112A-N can include establishing a connection with each of the wardens 112A-N using the addresses of the wardens 112A-N. SSL certificate verification techniques and/or TLS can also be used to verify that the wardens 112A-N are the correct wardens 112A-N to preside over the secure enclave environment 100. During verification, the wardens 112A-N can perform remote attestation. For example, the wardens 112A-N may not yet trust the oracle 108 that is established by the enclave 110, since the wardens 112A-N may not be sure whether the oracle is operating within the enclave 110. The wardens 112A-N can initiate remote attestation to ensure that code of the oracle 108 is executing in the enclave 110 and that the correct configuration file is being used. Remote attestation can occur whenever the enclave 110 begins executing for a first time or subsequent times. Remote attestation provides a mechanism for the wardens 112A-N (or other computing servers) to trust the enclave 110 of the oracle 108.

In general, remote attestation of the enclave 110 of the oracle 108 can be performed by one or more attestation servers 120 (e.g., the wardens 112A-N, servers that consume information provided by the oracle 108, or other sorts of third party servers). The current version of the computer code for executing the enclave 110 can be publicly accessible from an open code data store 122, and can be independently reviewed and validated by third parties to ensure that the code is trustworthy and error-free. After the enclave's computer code has been validated, for example, the attestation server(s) 120 can receive or generate a validated hash value 124 for the enclave 110 that is based on the validated version of the enclave (e.g., a hash value that has been generated from the enclave's publicly accessible and validated computer code). The validated hash value 124, for example, can be received by the attestation server(s) 120 from the open code data store 122 or another data source. A current hash value 126 that is generated for the enclave 110 can be compared to the validated hash value 124 to determine whether the enclave 110 is secure and valid. For example, the attestation server(s) 120 can receive the current hash value 126 for the code being executed by the enclave 110, and can compare the current hash value 126 to the validated hash value 124. If the hash values match, the remote attestation passes, whereas if the hash values do not match, the remote attestation fails. In some implementations, a user or other entity at a client computing device can initiate remote attestation. For example, the client computing device can transmit a remote attestation request to the attestation server(s). In some implementations, remote attestation can be performed on the wardens 112A-N. For example, the open code data store 122 can provide public access to a current version of computer code of any of the wardens 112A-N. A validated hash value 124 that corresponds to a validated version of the computer code for a particular warden can be compared to a current hash value 126 for the computer code currently being executed by the warden to determine whether remote attestation of the warden passes or fails.

After the wardens 112A-N have been verified (and the enclave 110 of the oracle 108 has passed the remote attestation process), the enclave 110 can divide the master secret key into secret shares. In some implementations, the master secret key can be divided into a number of secret shares that equals a quantity of the wardens 112A-N. For example, if there are 10 verified wardens 112A-N, then the master secret key can be divided into 10 secret shares. In some implementations, the master secret key can be divided into as many secret shares as instructed in the configuration file. For example, the master secret key can be divided into a number of secret shares that is less than the quantity of wardens 112A-N. In some implementations, the master secret key can be divided into a number of secret shares that is greater than the quantity of wardens 112A-N. The secret shares can be distributed amongst the wardens 112A-N. For example, each of the wardens 112A-N (or a subset of the wardens 112A-N) can receive a secret share. Distributing the secret shares of the master secret key can be advantageous to secure the enclave 110 and prevent attacks or other security compromises on the enclave 110. Further, no single warden can act alone or maliciously in the enclave 110 with one of the secret shares. Changes to the enclave 110 and transactions that occur in the enclave 110 can be made by pooling the secret shares and reassembling the master secret key with K of the secret shares. Accordingly, each of the wardens 112A-N can store their secret shares of the master secret key (e.g., in a private data store of the warden). When the enclave 110 starts up or restarts, for example, the enclave 110 can retrieve the secret shares from the wardens 112A-N to regenerate the master secret key. After the enclave 110 transmits the secret shares to the wardens 112A-N, the enclave 110 can be executed to perform operations of the oracle 108.

In general, the enclave 110 of the oracle 108 can provide active instructions to the wardens 112A-N to gather data from the data source(s) 150, and/or can passively monitor events and data received from the wardens 112A-N. Data can be relayed from the wardens 112A-N to the enclave 110, and a K of N consensus between the wardens 112A-N can be determined before the enclave 110 takes action. The wardens 112A-N can also track which transactions have been processed by the enclave 110 and/or which data has been provided. Tokens of the blockchain 104 can be used in some implementations to pay associated fees for moving tokens (e.g., token quantities) across blockchain wallets and/or for executing smart contracts that use information provided by the oracle 108. The enclave 110 described herein can be stateless. As a result, at any point an oracle 108 can be created or migrated to. When a consensus is reached amongst at least a majority of the wardens 112A-N, the new oracle and/or enclave can be established. The oracle can also be reconstructed using secret shares of a master private key of the enclave 110 that are held by the wardens 112A-N.

In some implementations, data from an external data source can be directly accessed by a secure enclave, instead of a warden server functioning as an intermediary to the data source. For example, the enclave 110 can have a respective data connection 130 to each of the data source(s) 150, and can directly poll the data source(s) and/or receive data as it is pushed by the data source(s). The data source(s) 150 and the techniques being used to communicate with the data source(s) can be defined in the source code of the enclave 110, for example, and can be publicly visible to the attestation servers(s) 120 (e.g., the wardens 112A-N, servers that consume information provided by the oracle 108, or other sorts of third party servers) during remote attestation of the source code. Thus, the wardens 112A-N can perform a role in the secure enclave environment 100 (e.g., attestation, secret sharing, selection of a new enclave, etc.) and can ensure trustworthiness in the environment 110 without necessarily providing data that has been collected from an off-chain data source. A possible benefit of this approach is that only the enclave 110 would directly access the data source(s) 150 (e.g., which may involve the use of restricted access protocols such as paid API keys), rather than each of the wardens 112A-N having independent access to the data source(s).

Figure 2:
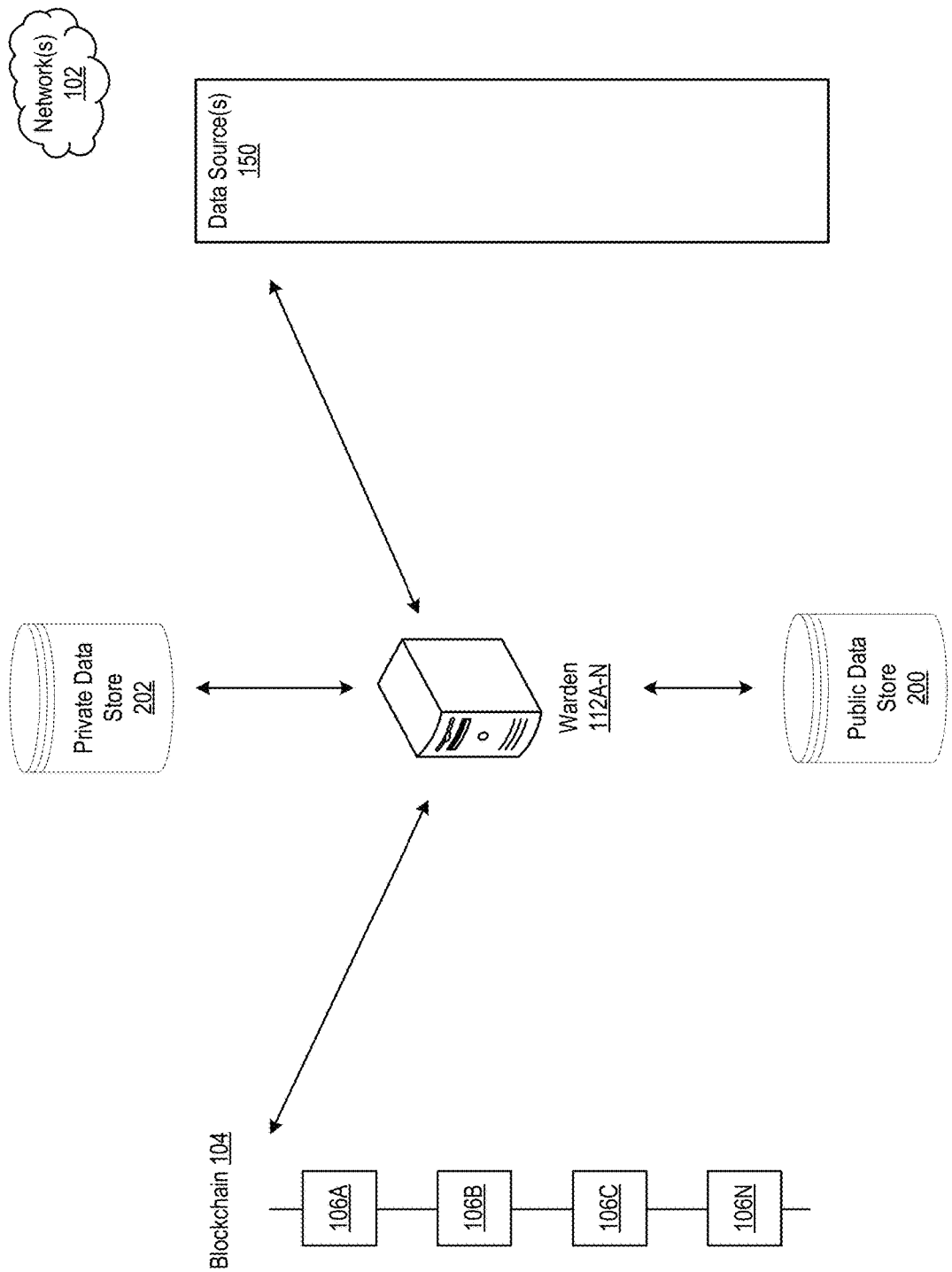
FIG. 2 is a conceptual diagram of wardens that perform some of the techniques described herein.

FIG. 2 is a conceptual diagram of wardens 112A-N that perform some of the techniques described herein. As described in reference to FIG. 1, each of the plurality of wardens 112A-N can be an anonymous computer server, system, and/or network of computing devices that can communicate with each other, with the blockchain 104, and with the data source(s) 150 via the network(s) 102. Each of the wardens 112A-N, for example, can be configured to execute data collection code (e.g., the same code or different code) to collect the data from various data sources. Each of the wardens 112A-N can also communicate with a private data store 202 and a public data store 200. In some implementations, each of the wardens 112A-N can communicate with a different private data store 202 and all of the wardens 112A-N can communicate with the same public data store 200. In some implementations, each of the wardens 112A-N can communicate with different private and public data stores.

The wardens 112A-N can be trusted parties that have several responsibilities in the secure enclave environment described throughout this disclosure. The oracle 108 (shown in FIG. 1) can, for example, rely on the wardens 112A-N to both read and update a state of the blockchain 104 that is supported by the secure enclave environment, and to provide real world data that is available from the data source(s) 150. The enclave 110 can be configured to send requests to multiple independent wardens 112A-N, and a quorum of these wardens 112A-N can provide corresponding responses in order for the enclave 110 to accept the responses. This can ensure that no single warden can provide false data or otherwise act maliciously to deceive the enclave 110. By including multiple wardens 112A-N (and/or a threshold number of wardens 112A-N for a quorum) in the secure enclave environment, operations of the oracle 108 can be distributed, secure, and trustworthy. In some implementations, at least some of the wardens 112A-N can be adjudicators that are configured to verify that the oracle code running in the enclave is valid and unaltered from a verified version of the oracle code.

As described in reference to FIG. 1, each of the wardens 112A-N can receive a single secret share of a master secret key from the enclave when the enclave first initializes. A configurable threshold of these shares can be sufficient to regenerate the enclave's master secret key. If the enclave were to restart, the enclave can query the wardens 112A-N to get the secret shares and recompute the enclave's master secret key value. Other secret values used by the enclave can be deterministically derived from the master secret key.

The wardens 112A-N can also continuously monitor or otherwise index the blockchains 104. The enclave can query the wardens 112A-N for transactions sent to a specific address on the blockchain 104. The wardens 112A-N can build an index of transactions in data stores such as the private data store 202. To build the index, the wardens 112A-N can query the nodes 106A-N the blockchain 104 for each block and can iterate through the transactions. The wardens 112A-N can also track which requests (e.g., requests for information from the oracle 108) have been processed by the enclave.

In some implementations, the wardens 112A-N can host public information. For example, information related to oracle requests (e.g., types of information that are available from the oracle 108), fees, minimum transfer requirements, and supported tokens can be configured and maintained in the enclave. If the enclave is not publicly accessible, for example, the wardens 112A-N can publicly host that information. In addition, the wardens can be responsible for hosting an attestation report for public consumption. This information can be stored in the public data store 200 and retrieved when reported out to the public by the wardens 112A-N.

In some implementations, the wardens 112A-N can be modified. To change membership of the wardens 112A-N for a particular secure enclave environment, code that is run by the enclave can be modified to include an identifier (e.g., domain) of each warden that will act in the secure enclave environment. The existing wardens 112A-N may be required to agree to the change in membership before the wardens 112A-N are updated. Standard TLS techniques can be used to ensure that correct and secure communication is established between the wardens 112A-N, the enclave of the oracle 108, and data source(s) described herein.

Figure 3A:
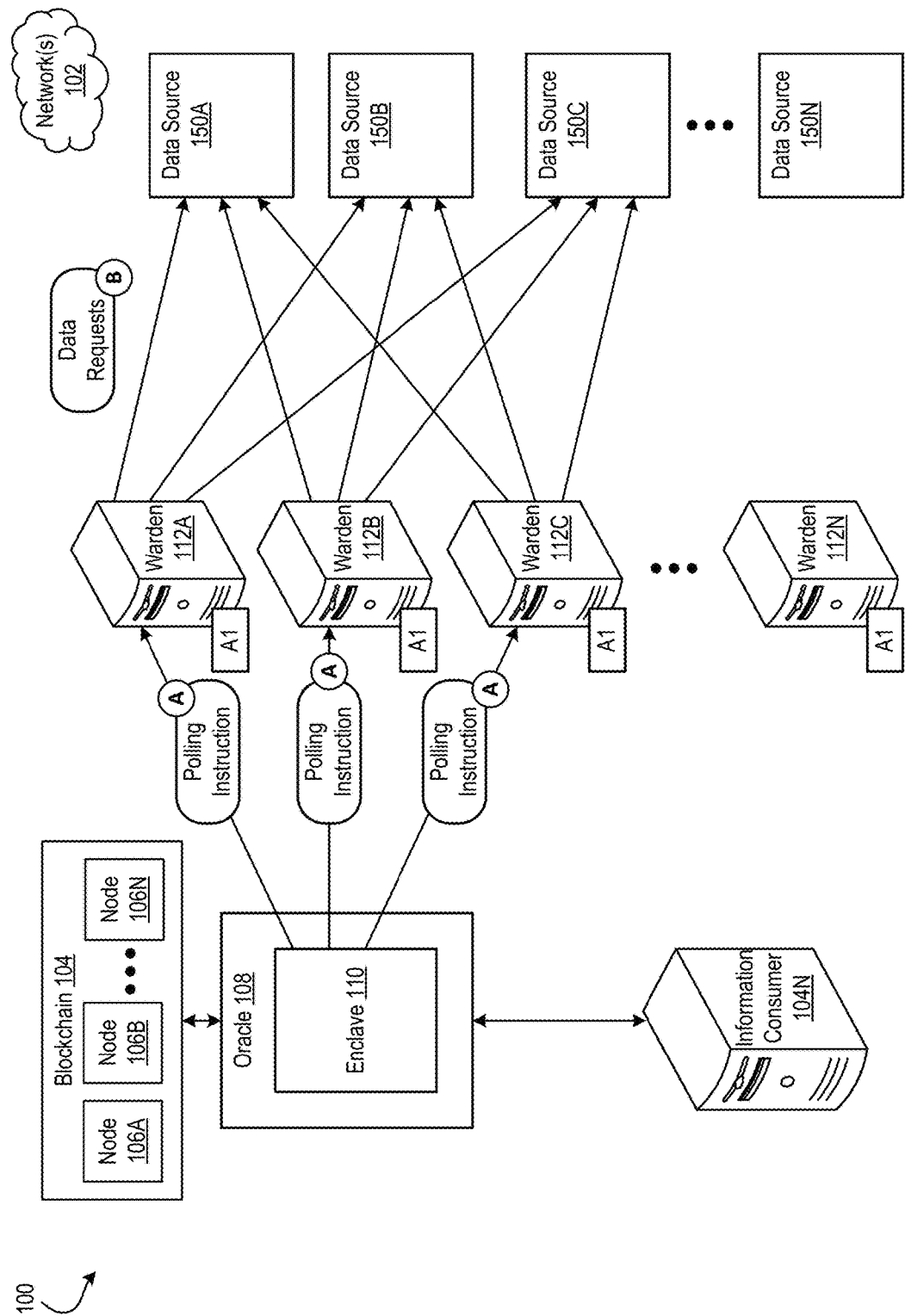
FIGS. 3A and 3B are conceptual diagrams of a synchronous process for providing trustworthy consensus information using the techniques described herein.
Figure 3B:
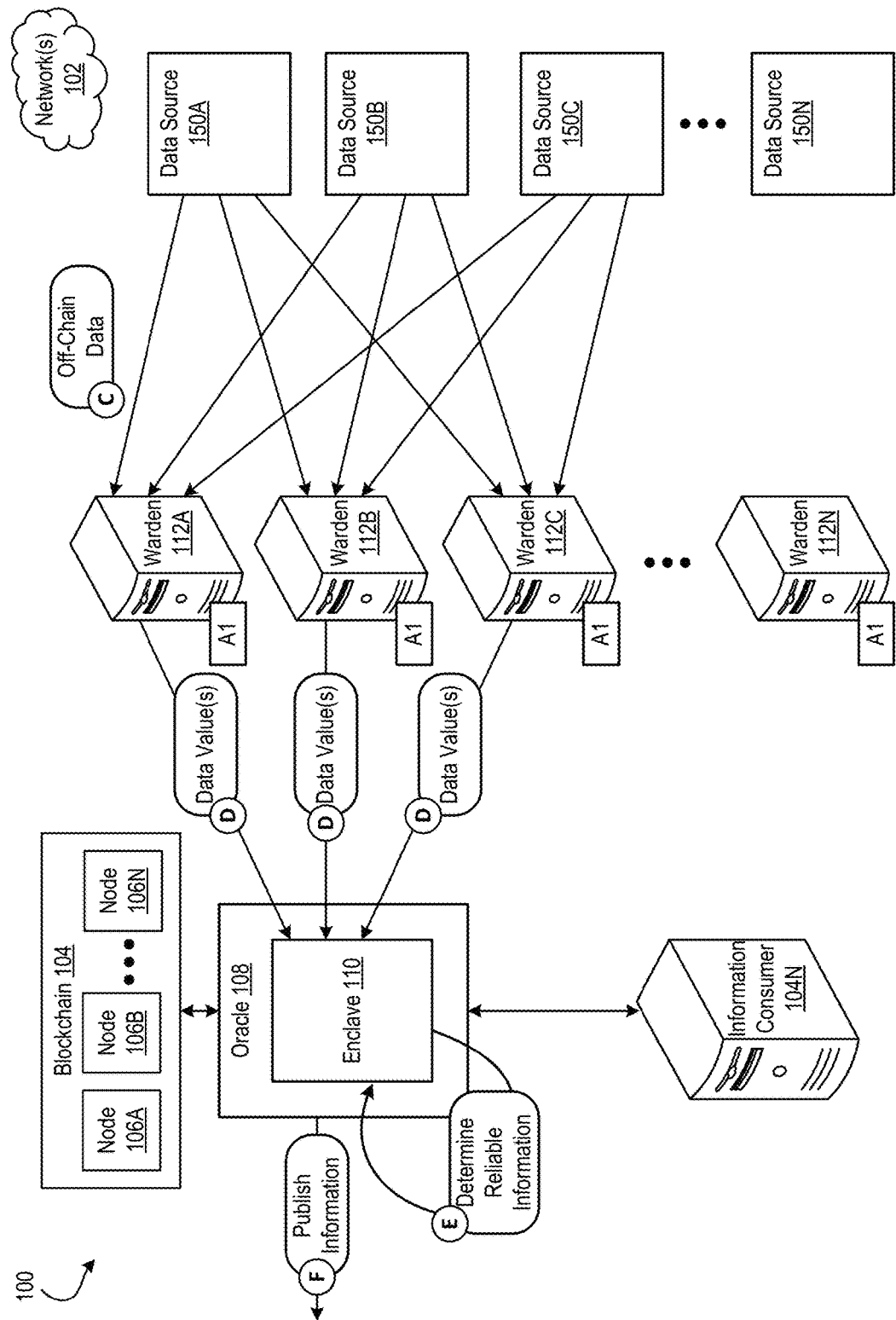

FIGS. 3A-B are conceptual diagrams of a synchronous process for providing trustworthy consensus information using the techniques described herein. FIGS. 3A-B show operations of elements of the secure enclave environment 100 described with respect to FIGS. 1 and 2, including the oracle 108, the secure enclave 110 of the oracle 108, and a pool of wardens 112A-N. The pool of wardens 112A-N, for example, can include several similarly configured wardens (e.g., at least three, but possibly dozens or hundreds of wardens) that are each configured to collect data from one or more data sources. Briefly, multiple of the wardens 112A-N can be similarly configured (e.g., can execute similar data collection code), and can synchronously receive off-chain data values from various data sources 150A-N and can provide the off-chain data values to the secure enclave 110 of the oracle 108. The oracle 108 can use the secure enclave 110 to determine reliable information from the off-chain data values received from multiple of the wardens 112A-N, and can provide the reliable information for use by other systems/devices.

Figure 4:
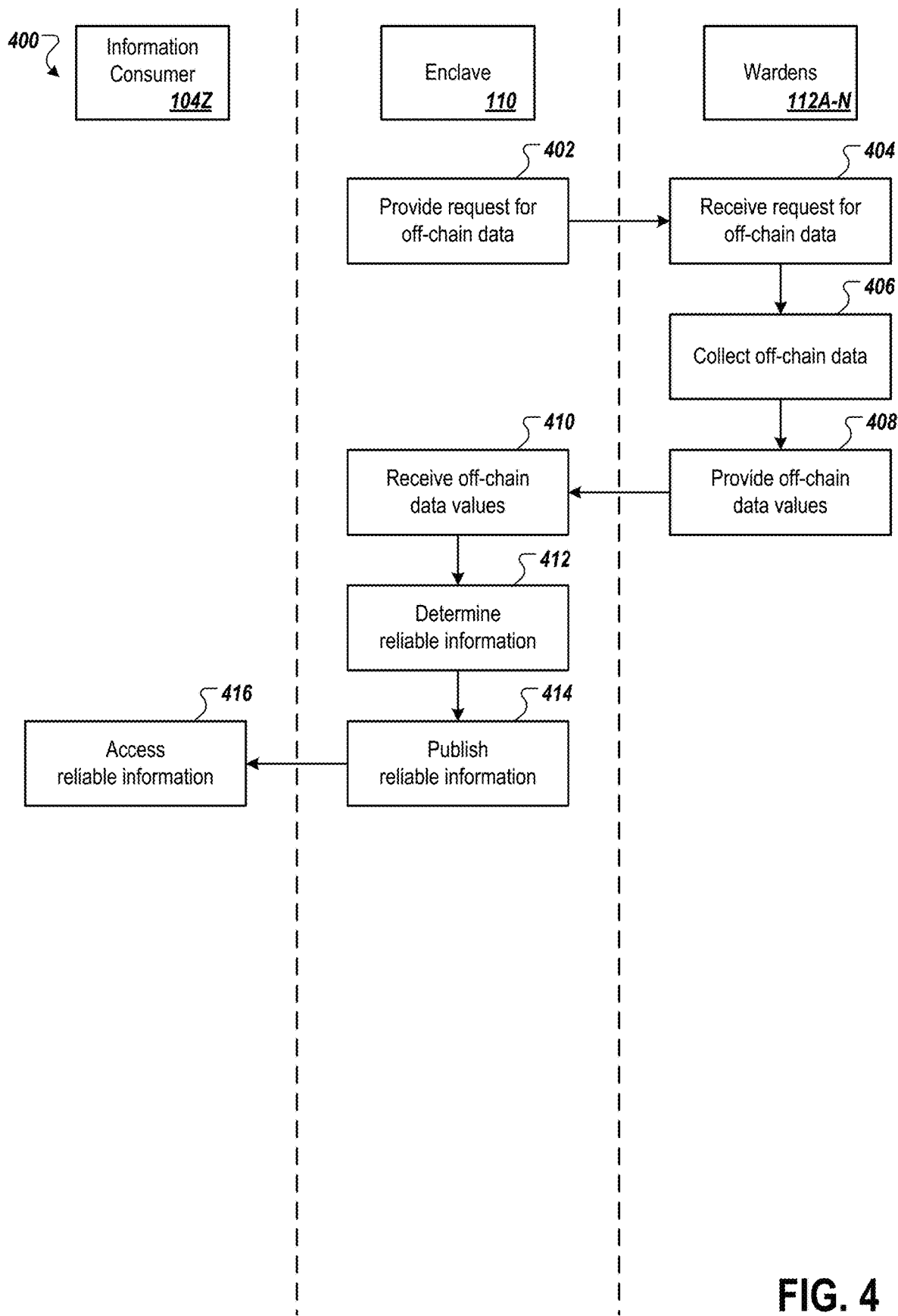
FIG. 4 is a swimlane diagram of a synchronous process for providing trustworthy consensus information.

Referring now to FIG. 4, a swimlane diagram of an example synchronous process 400 for providing trustworthy consensus information is shown. In general, the synchronous process 400 can be orchestrated by the enclave 110 of the oracle 108. The process 400 can be performed by elements of a secure enclave environment, and will be described with respect to the secure enclave environment 100 shown in FIGS. 3A-B for purposes of clarity. However, in other examples, the process 400 can be performed by differently configured execution environments.

In some implementations, the process 400 can be initiated by one or more wardens 112A-N. For example, the warden(s) 112A-N can monitor the blockchain 104 for transaction data that indicates a data request by an information requestor (e.g., a computing device 104Z of an information consumer that has submitted a transaction to the blockchain 104 that includes a request for information), and can provide the enclave 110 with a notification of the data request. The notification of the data request, for example, can be sent to the enclave 110 by warden(s) 112A-N immediately upon detection, or the enclave 110 can periodically poll the wardens for new requests, and in response the wardens can provide the enclave 110 with any requests that were detected since a previous poll. After the enclave has determined that a sufficient number of the warden(s) 112A-N has detected the data request (e.g., a specified number or proportion of the wardens), the enclave 110 can coordinate collection by the wardens of off-chain data that pertains to the request (e.g., through stages 402-410 below), or the enclave 110 can itself perform collection of the off-chain data. As another example, in response to detecting the data request on the blockchain 104, the one or more of the warden(s) 112A-N that detected the data request can collect off-chain data (e.g., as in stage 406 below), and can provide the off-chain data to the enclave 110 along with the notification of the data request.

In some implementations, the process 400 can be initiated by the enclave 110 of the oracle 108 in response to a request from a computing device that is external to the oracle 108 and that is configured to consume requested data. For example, one or more nodes 106A-N of the blockchain 104 that are executing a smart contract can submit a request to the oracle 108 for current off-chain data values for use as a condition/parameters for the smart contract. As another example, an information consumer server 104N (e.g., a non-blockchain server that is configured to execute computer code that uses consensus information determined by the oracle 108) can submit a request to the oracle 108 for current off-chain data.

In some implementations, the process 400 can be periodically initiated by the oracle 108 of the enclave 110 (e.g., in response to an event received from a system timer). For example, at periodic time intervals (e.g., once every five seconds, once a minute, once an hour, or at another appropriate time interval), the enclave 110 can initiate the process 400 for providing trustworthy consensus information. As part of the process 400, for example, the enclave 110 of the oracle 108 can periodically publish the trustworthy consensus information to the blockchain 104. In the present example, if any blockchain nodes 106A-N were to need recent information that originated from outside of the blockchain 104 (e.g., off-chain data values for use as a smart contract trigger and/or smart contract parameters), the blockchain nodes could query the blockchain 104 for the most recent information rather than directly query the oracle 108—thus potentially improving system response times. As another example, the enclave 110 of the oracle can periodically publish the trustworthy consensus information to another sort of information consumer 104N.

Referring again to the process 400, a request is provided for off-chain data (402), and the request for off-chain data is received (404). As shown in FIG. 3A, for example, during stage (A), the enclave 110 of the oracle 108 can provide polling instructions for receipt by multiple of the wardens 112A-N. The polling instructions provided to a warden can include commands that instruct the warden to poll one or more of the data sources 150A-N for data values. In general, the data values can include any sort of data that may be made available from computer-based data sources (e.g., servers, websites, exchanges, directories, physical sensors, etc.). For example, the data values/sources can be asset prices that are available from computerized exchanges, sports scores that are available from news websites and/or server APIs, statistics and/or data that pertain to file directories, environmental data (e.g., temperature, humidity, wind speed, etc.) that is provided by physical sensors, and so forth. In the present example, the data sources 150A-N can represent various different exchange servers, and the data values can represent current prices of an asset that is available from the exchanges.

In some implementations, polling instructions can be provided to all of the wardens 112A-N that are in communication with the enclave 110. In some implementations, polling instructions can be provided to a subset of the wardens 112A-N that are in communication with the enclave 110. For example, some wardens can be responsible for collecting particular data values, where other wardens can be responsible for collecting other data values or performing other tasks in the secure enclave environment (e.g., attestation, transaction processing, etc.). In the present example, polling instructions are provided to wardens 112A, 112B, and 112C, but are not provided to warden 112N.

In some implementations, the polling instructions can be simultaneously provided to each warden. For example, the enclave 110 can simultaneously (or nearly simultaneously, e.g., within a second) provide the same polling instructions to each of the wardens 112A, 112B, and 112C. The polling instructions, for example, can include identifiers (e.g., device identifiers, network locations, network addresses, etc.) for each of the data sources to which data requests are to be provided. In the present example, each of the polling instructions provided by the enclave 110 to the wardens 112A, 112B, and 112C during stage (A) can specify that data requests are to be provided by the respective wardens to each of data sources 150A, 150B, and 150C. As another example, the polling instructions can include a basic command to request data from data sources, and the identifiers of the specific data sources from which data is to be collected can be maintained in code and/or configuration data by each of the wardens 112A, 112B, and 112C.

Off-chain data is collected (406). As shown in FIG. 3A (during stage (B)), the wardens (e.g., wardens 150A, 150B, and 150C) can request data from various different data sources, and as shown in FIG. 3B (during stage (C)), the wardens can receive data values from the data sources. For example, in response to receiving the polling instructions from the enclave 110, each of the wardens that has received the polling instructions (e.g., 112A, 112B, and 110C) can provide corresponding data requests (e.g., API calls, data queries, etc.) to multiple different data sources (e.g., data sources 150A, 150B, and 150C). As another example, the wardens can actively collect data from various data sources (e.g., by scraping webpages, activating sensors, or using another active data collection technique). In the present example, each of the wardens 112A, 112B, and 112C can independently provide separate requests to each of the exchanges represented by data sources 150A, 150B, and 150C, for a data value that indicates a current price of an asset on the exchange. As another example, each of the wardens 112A, 112B, and 112C can independently provide requests for data values to a single, common data source (e.g., one of the data sources 150A, 150B, or 150C).

In some implementations, each of the wardens can execute the same data collection code when collecting off-chain data. For example, each of the wardens 112A, 112B, and 112C can execute data collection code that causes the warden to communicate with each of the data sources 150A, 150B, and 150C using similar techniques, at similar times, and in a similar sequence. The data collection code of the wardens, for example, can be publicly accessible from the open code data store 122 (shown in FIG. 1), and can be attestable using the attestation server(s) 120 (also shown in FIG. 1). In the present example, each of the wardens 112A, 112B, 112C, and warden 112N are each configured to execute data collection code A1. In some implementations (and as described in further detail below), one or more wardens can be configured to execute data collection code that is different from other wardens.

Off-chain data values are provided (408). Referring again to FIG. 3B, for example, during stage (D), each of the wardens 112A, 112B, and 112C can provide the data values the respective warden has collected from data sources 150A, 150B, and 150C. In some implementations, a warden can provide all of the data values that the warden has collected. For example, warden 112A can provide a data value according to data source 150A (e.g., a price of an asset on a first exchange), another data value according to data source 150B (e.g., a price of the asset on a second exchange), and another data value according to data source 150C (e.g., a price of the asset on a third exchange). Similarly, wardens 112B and 112C can also each provide data values collected from each of the data sources 150A, 150B, and 150C. In some implementations, a warden can provide a single data value that is derived from the individual data values that the warden has collected. For example, warden 112A (and similarly, wardens 112B and 112C) can provide derive a single value (e.g., an average value, a median value, a mode value, or another sort of derived value) that is derived from the individual data values collected from the data sources 150A, 150B, and 150C.

The off-chain data values are received (410). For example, the enclave 110 can receive the one or more data values provided by the wardens 112A, 112B, and 112C. Since the process 400 is synchronized (e.g., with data collection being performed by the wardens in response to a polling instruction at substantially similar times), the off-chain data values that pertain to a particular polling instruction are generally expected to be received by the enclave 110 within a designated time window. For example, the designated time window can be between one and five seconds after providing a polling instruction, between two and ten seconds after providing the polling instruction, between five and twenty seconds after providing the polling instruction, or another time window that is designated by the enclave 110 as being appropriate for fulfilling a data request, based on network conditions, server capabilities, request complexity, and other related factors. However, based on conditions of the network(s) in which the data requests are being made, the statuses of devices from which the data values are being provided, and other conditions, off-chain data values may or may not be received within the designated time window, from all of the wardens to which polling instructions were provided. For example, warden 112A and 112B may each experience favorable network conditions and therefore be able to provide data values from each of the data sources 150A, 150B, and 150C, whereas warden 112C may experience a network interruption and therefore be unable to provide any data values within the designated time window. Further, the provided data values may not include respective data values from all of the data sources from which the data values were requested. For example, none of the wardens 112A, 112B, and 112C may be able to communicate with a particular data source (e.g., data source 150C) within a designated time window, and therefore may simply provide data values from data sources with which the wardens were able to successfully communicate (e.g., data sources 150A and 150B).

Reliable information is determined from the received off-chain data values (412). During stage (E), for example, the enclave 110 can execute code to analyze the off-chain data values that were received from any of the wardens 112A, 112B, and/or 112C during the designated time window, and can determine from the received off-chain data values consensus information that most likely represents an actual real world condition (e.g., an asset price on a particular exchange or an average asset price across a group of exchanges, a current score of a sporting event, a current temperature in a city, etc.).

In some implementations, determining reliable information from data values received from wardens can be initiated at the end of a designated time window. For example, the enclave 110 can initiate a process for determining the reliable information after a designated amount of time has elapsed (e.g., five seconds, ten seconds, twenty seconds, or another appropriate amount of time) after the polling instructions were provided. In the present example, the enclave 110 can determine the reliable information from an analysis of all of the data values that have been received during the designated time window. By waiting for the designated time window to elapse before analyzing the received data, for example, the enclave 110 can potentially base its analysis on a larger data sample, thus improving information reliability.

In some implementations, determining reliable information from data values received from wardens can be initiated after data values have been received from a designated number of wardens. For example, the enclave 110 can track which wardens have provided data values during a designated time window, and can begin analyzing the data values immediately after receiving data values from the designated number of wardens (e.g., a number of wardens that corresponds to a threshold percentage, such as 50% of the wardens, 60% of the wardens, 80% of the wardens, or another appropriate threshold percentage). By initiating the data value analysis immediately after receiving data values from a designated number of wardens, for example, the enclave 110 can potentially reduce an amount of time for providing reliable information.

In some implementations, determining reliable information from data values received from wardens can be performed only when data values have been received from a designated threshold number of wardens (or more). For example, after providing polling instructions to the wardens 112A, 112B, and 112C, the enclave 110 can wait for corresponding data values to be returned by the wardens (e.g., the enclave 110 can wait for a designated time window, or can wait indefinitely). By considering the number/proportion of responding wardens as a condition for determining reliable information, for example, the enclave 110 can prevent possible attempts by the wardens 112A-N to skew the information provided by the enclave 110 through the provision of deceptive data values.

If responses are received from fewer than the designated number of wardens, for example, the enclave 110 can elect to not determine and provide any information. Instead, the enclave 110 can elect to provide new polling instructions in another attempt to gather data values from the wardens. The new polling instructions can be provided to the same group of wardens as in the previous attempt to gather data values, or can be provided to a different group of wardens. For example, the enclave 110 can send the new polling instructions to the wardens that had responded to the previous polling instructions, and can elect to not send the new polling instructions to the wardens that had not responded to the previous polling instructions—instead, replacing those non-responding wardens with new, different wardens. As another example, the enclave 110 can send the new polling instructions to a completely different group of wardens. The new polling instructions can be the same instructions that were sent in a previous attempt to gather data values, or can be modified polling instructions. For example, in a subsequent attempt to gather data values from the wardens, the enclave 110 can modify the polling instructions to the wardens to specify different source(s) to be used for collecting the data values and/or a different time window for collecting the data values (e.g., a longer time window). By modifying the polling instructions and/or the group of wardens that are to perform the polling instructions, for example, the enclave 110 can flexibly adapt to changing network conditions.

In general, determining reliable information from data values received from wardens can include deriving the reliable information based on an analysis of the received data values. As the data values that have provided by the wardens in the example synchronous process 400 have been collected during a common timeframe (e.g., during a same designated time window), from common data sources (e.g., data sources 150A, 150B, and 150C), for example, the data values can be expected to be the same, or to be similar. Thus, outlier data values (e.g., data values that are dissimilar from the majority of received data values, data values that are outside of a range around an average data value, etc.) can be discarded, and the wardens that have provided such values can be flagged for possible removal from a group of wardens that are to receive future polling instructions. Determining reliable information from the data values that remain after discarding the outlier data values can be based in part on a type of data for which the data values pertain. For discrete data (e.g., a current sports score, a current asset price at a particular exchange, etc.), determining the reliable information can include determining a mode from the provided data values (e.g., a most commonly provided value). For continuous data (e.g., a temperature, a current average asset price across multiple exchanges, etc.), determining the reliable information can include determining an average value or median value from the provided data values.

In some implementations, determining reliable information from data values received from wardens can include determining whether a sufficient number of the received data values are in conformance. For discrete data, for example, if a threshold number of the received data values are the same value (e.g., at least 50%, 60%, 80%, or another suitable percentage of the values are the same), the enclave 110 can determine that the agreed upon data value is reliable information, whereas if fewer than the threshold number of the received data values are the same value, the enclave 110 can delay providing an indication that reliable information has been determined. For continuous data, for example, if a threshold number of the received data values are within a range of an average or median data value determined by the enclave 110 (e.g., the data values have a variance of 5%, 10%, 20%, or another appropriate variance value), the enclave 110 can determine that the average or median data value is reliable information—otherwise, the enclave 110 can delay providing an indication that reliable information has been determined. By determining whether a sufficient number of the received data values are in conformance before publishing information based on the data values, for example, the enclave 110 can avoid being influenced by malevolent actors and/or incongruities that may result from rapid data shifts, thus improving the accuracy and trustworthiness of its published information.

After reliable information has been determined, the reliable information can be published (414). During stage (F), for example, the enclave 110 can publish the reliable information. In the present example, the enclave 110 can publish the average price for a particular asset, across multiple different exchanges (e.g., exchanges represented by data sources 150A, 150B, and 150B). The reliable information can be published at regular intervals (e.g., once every ten seconds, once a minute, once every five minutes, or at another appropriate interval), such that reliable, up-to-date consensus information is available to information consumers. In some implementations, the reliable information can be published to a blockchain. For example, the enclave 110 can publish the reliable information to the blockchain 104. In some implementations, the reliable information can be published to a non-blockchain server. For example, the enclave 110 can publish the reliable information to the information consumer server 104N.

The published reliable information is accessed by an information consumer (416). As shown in FIG. 4, information consumer 104Z (e.g., any of the nodes 106A-N of the blockchain 104, the information consumer server 104N, or another sort of computing device) can access the published reliable information. For example, the nodes 106A-N of the blockchain 104 can access the published reliable information that has been published to the blockchain 104 when executing a smart contract that uses the information. As another example, the information consumer server 104N can provide the published information to other computing devices for presentation to users and/or for use as triggers and/or parameters for other online processes.

Figure 5A:
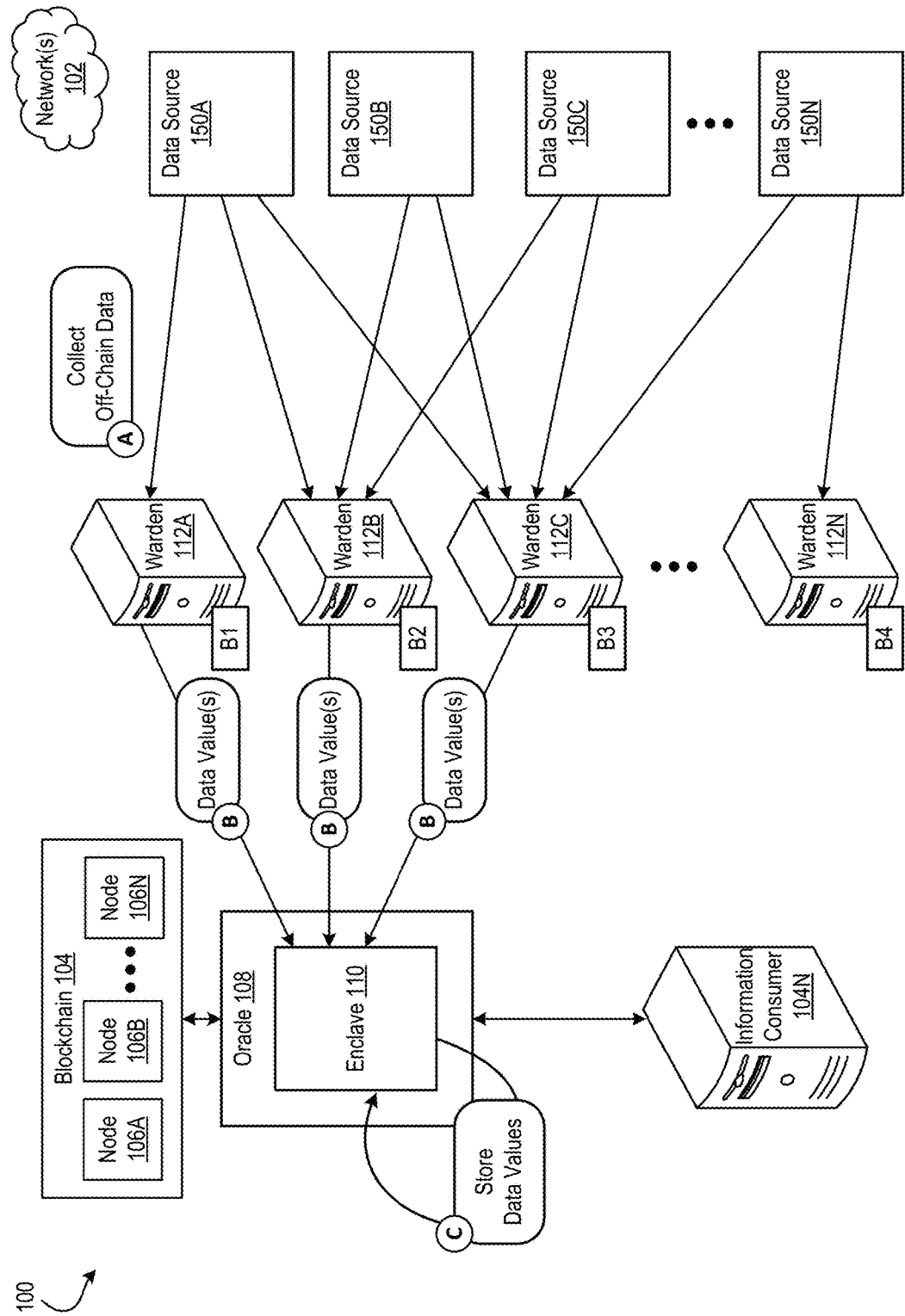
FIGS. 5A, 5B, and 5C are conceptual diagrams of an asynchronous process for providing trustworthy consensus information using the techniques described herein.
Figure 5B:
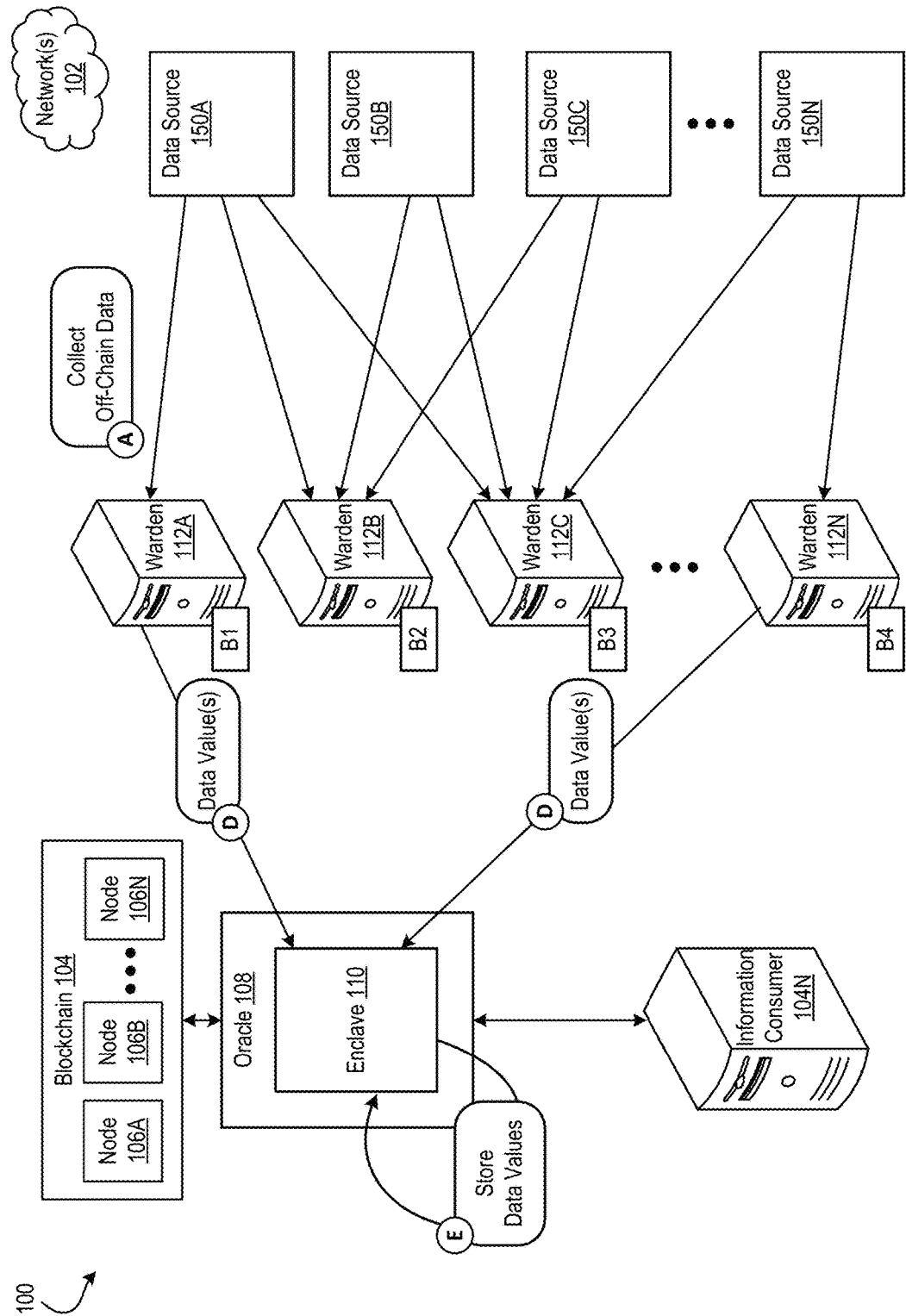
Figure 5C:
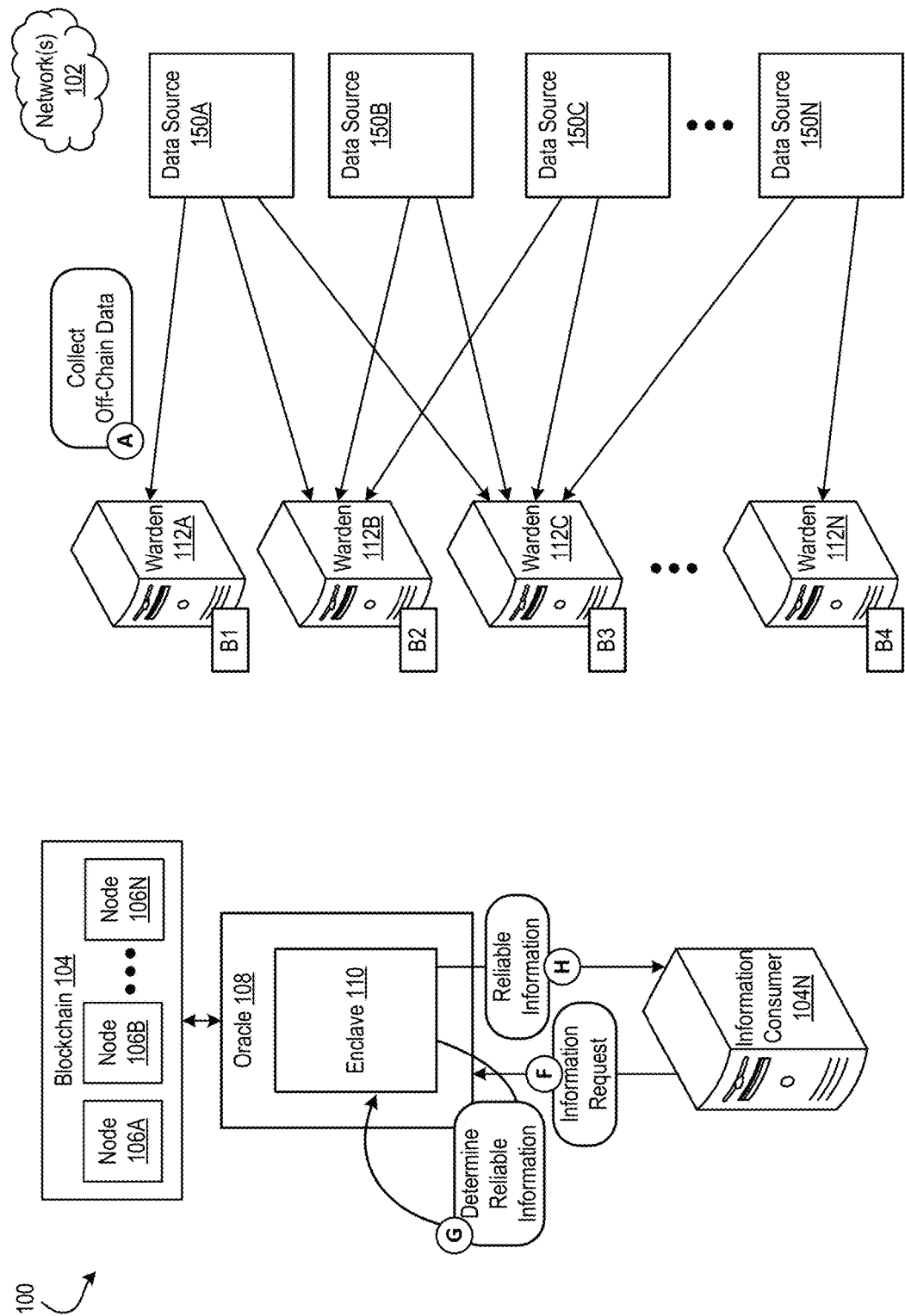

FIGS. 5A-C are conceptual diagrams of an asynchronous process for providing trustworthy consensus information using the techniques described herein. FIGS. 5A-C show operations of elements of the secure enclave environment 100 described with respect to FIGS. 1 and 2, including the oracle 108, the secure enclave 110 of the oracle 108, and a pool of wardens 112A-N. The pool of wardens 112A-N, for example, can include several wardens (e.g., at least three, but possibly dozens or hundreds of wardens) that are each configured to collect data from one or more data sources. Briefly, multiple of the wardens 112A-N can be differently configured (e.g., can execute different data collection code), and can independently and asynchronously receive off-chain data values from various data sources 150A-N and can provide the off-chain data values to the secure enclave of the oracle 108. The oracle 108 can use the secure enclave 110 to determine reliable information from the off-chain data values received from multiple of the wardens 112A-N, and can provide the reliable information for use by other systems/devices.

Figure 6:
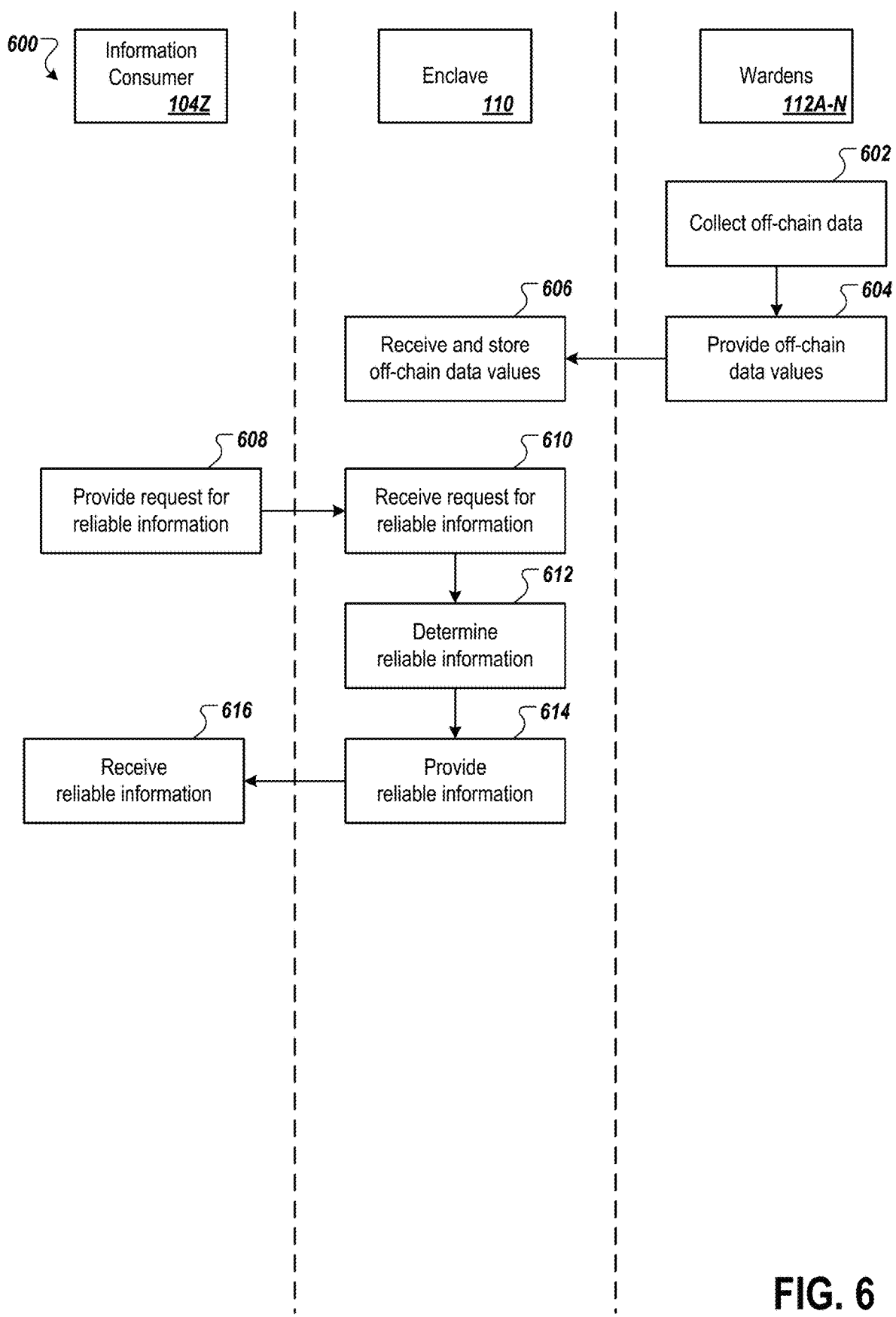
FIG. 6 is a swimlane diagram of an asynchronous process for providing trustworthy consensus information.

Referring now to FIG. 6, a swimlane diagram of an example asynchronous process 600 for providing trustworthy consensus information is shown. In general, the asynchronous process 600 can be orchestrated by the enclave 110 of the oracle 108 and by the wardens 112A-N. The process 600 can be performed by elements of a secure enclave environment, and will be described with respect to the secure enclave environment 100 shown in FIGS. 5A-C for purposes of clarity. However, in other examples, the process 600 can be performed by differently configured execution environments.

In general, at least some of the operations performed in the process 600 can be performed by the wardens 112A-N without specific instructions from the enclave 110 of the oracle 108. The wardens 112A-N, for example, can operate relatively independently of the enclave 110 and each other, with at least one of the wardens executing different data collection code from other wardens. In some implementations, the process can be initiated by one or more of the wardens 112A-N. For example, the warden(s) 112A-N can monitor the blockchain for transaction data that indicates a data request by an information requestor (e.g., a computing device 104Z of an information consumer), and can provide the enclave 110 with a notification of the data request. In some implementations, the process 600 can be initiated by the enclave 110, either independently, or in response to one or more data request notifications that have been provided by one or more wardens. For example, before starting the process 600, each of the wardens 112A-N can receive a general request from the enclave 110 to perform a general data collection task (e.g., to report the current score of a sporting event for the event's duration, to report the current price of an asset, to report the current temperature of a city, or another sort of data collection task that may or may not be based on a specific data request by a specific information requestor), and the specific techniques for carrying out the data collection task (from which data sources to collect data, a frequency at which data is to be collected and/or reported, etc.) can vary from warden to warden, based on the data collection code of the particular warden. In the present example, warden 112A can execute data collection code B1, warden 112B can execute data collection code B2, warden 112C can execute data collection code B3, and warden 112N can execute data collection code B4.

Off-chain data can be collected (602). Referring to FIG. 5A, for example, during stage (A), each of the wardens 112A-N can execute their individual data collection code to collect and provide data values to the enclave 110 of the oracle 108, for use in determining and providing trustworthy consensus information (e.g., the current score of the sporting event). In the present example, the data collection code B1 of the warden 112A is configured to collect data from data source 150A; the data collection code B2 of the warden 112B is configured to collect data from data sources 150A, 150B, and 150C; the data collection code B3 of the warden 112C is configured to collect data from data sources 150A, 150B, 150C, and 150N, and the data collection code B4 of the warden 112N is configured to collect data from data source 150N. Collecting the data, for example, can include data collection techniques such as maintaining an open data channel for data being pushed by any of the data sources 150A-N, providing data requests and receiving corresponding responses from any of the data sources 150A-N (e.g., using API calls, data queries, etc.), and/or active data collection techniques (e.g., scraping webpages, activating sensors, performing visual and/or audio analysis of media feeds, etc.).

The off-chain data values can be provided (604). During stage (B), for example, one or more of the wardens 112A-N can provide collected data values to the enclave 110. The collected data values can generally be provided by each of the wardens 112A-N in a common data format that is used by the enclave 110 for receiving data. In some implementations, times at which the collected values are provided can be determined by a warden that collects the data values. For example, each of the wardens 112A-N can provide an updated data value when a change is detected in the data. In the present example, each of the wardens 112A, 112B, and 112C has detected a change in the score of the sporting event during a most recent time period (e.g., during the previous five second, or another recent time period), and thus has provided updated data values (e.g., the current score) to the enclave 110 in response to detecting the change. However, warden 112N in the present example has not detected a change in the score, and thus has not provided any updated data values. In some implementations, times at which the collected values are to be provided can be specified by a secure enclave that receives the data. For example, when providing a general request to perform a data collection task, the enclave 110 can specify that a current data value (e.g., the current score) is to be provided by each of the wardens 112A-N at a particular time interval (e.g., once every five seconds, once every ten seconds, once a minute, etc.). As another example, each of the wardens 112A-N can provide a data value update to the enclave 110 when a change occurs in the data, and can also provide regular pings to the enclave to notify the enclave that the warden is still actively monitoring potential data changes. Such a notification technique can be used to provide an assurance to the oracle 108 that the wardens 112A-N are still active, while potentially conserving network bandwidth (e.g., by not re-sending data values that have not changed between time intervals). The network bandwidth conservation, for example, can be particularly significant when the data values provided by the wardens 112A-N include large data sets and/or the specified time interval for providing the data values is short.

The off-chain data values can be received and stored (606). During stage (C), for example, the enclave 110 of the oracle 108 can receive the data values from each of the wardens 112A, 112B, and 112C and store the values (e.g., in memory and/or a persistent data storage area). In some implementations, reliable information can be determined by the secure enclave in response to receiving updated data values (e.g., a data value that reflects a change from a previously received data value) from any of the wardens. For example, the enclave 110 can compare the each of the data values received from each of the wardens 112A, 112B, and 112C (e.g., the current score according to the wardens) to the stored data values from the corresponding wardens, and can re-determine the reliable information when a change in any of the data values is detected. In some implementations, the data values received from the wardens can simply be stored, and the reliable information can be determined by the secure enclave at a later time (e.g., in response to a request for reliable information that is later received from another device).

The operations (602), (604), and (606) of the asynchronous process 600 for collecting off-chain data, providing off-chain data values, and receiving and storing off-chain data values can be continually and independently performed by the wardens 112A-N. Referring now to FIG. 5B, for example, each of the wardens 112A-N can continually collect off-chain data (e.g., during stage (A)), according to their particular data collection code. In the present example, wardens 112A and 112N have each detected a change in the data values during the current time period (e.g., a time period that occurs after the time period in which the operations shown in FIG. 5A occur). Warden 112A, for example, uses data collection code B1 and receives data from data source 150A, whereas warden 112B uses data collection code B4 and receives data from data source 150N. Since each of the wardens 112A and 112N in the present example use different data collection techniques and refer to different data sources, the data values collected by the wardens may be different, or may be similar. During stage (D), the data values collected by warden 112A and 112N are each provided by the respective warden to the enclave 110 of the oracle 108. After receiving the data values, for example, the enclave stores the data values during stage (E). The enclave 110, for example, can determine whether the data values have been updated, and if so, can replace (e.g., in memory and/or persistent storage) an updated data value received from a warden with the previous data value received from the warden.

A request for reliable information can be provided (608) and received (610). Referring now to FIG. 5C (and FIG. 6), for example, during stage (F), information consumer 104Z (e.g., any of the nodes 106A-N of the blockchain 104, the information consumer server 104N, or another sort of computing device) can provide an information request for receipt by the enclave 110 of the oracle 108. For example, a smart contract being executed by the nodes 106A-N of the blockchain 104 can request reliable off-chain information (e.g., the current score of a sporting event) from the enclave 110 of the oracle 108. As another example, the information consumer server 104N (e.g., a non-blockchain server) can request the reliable off-chain information.

After receiving the request for reliable information, reliable information can be determined or retrieved (612), provided (614), and received (616). Referring again to FIG. 5C (and FIG. 6), for example, during stage (G), the enclave 110 can determine the reliable information, and during stage (H), the enclave 110 can provide the reliable information to information consumer 104Z (e.g., any of the nodes 106A-N of the blockchain 104, the information consumer server 104N, or another sort of computing device).

In some implementations, the reliable information can be determined before receiving the request for reliable information, and can simply be retrieved in response to receiving the request. For example, the enclave 110 can determine the reliable information in response to receiving updated data values from any of the wardens 112A-N (e.g., during stage (C), and again in stage (E)), and can cache the information for possible later use in satisfying a request from an information consumer. As another example, the enclave 110 can determine the reliable information at regular intervals (e.g., once every five seconds, once every ten seconds, once every twenty seconds, or another appropriate interval based on use of the oracle 108). By determining the reliable information before it is requested, for example, the enclave 110 can decrease response times when fulfilling information requests, which may be advantageous when a high volume of information requests are received.

In some implementations, the reliable information can be determined in response to receiving the information request. For example, in response to receiving the information request from the information consumer server 104N, the enclave 110 of the oracle 108 can determine the reliable information from the various data values that have been received from the wardens 112A-N and that have been maintained by the enclave 110. By determining the reliable information when it is requested, for example, the enclave 110 can potentially conserve processing resources in scenarios in which relatively few information requests are received—that is, the enclave 110 can avoid situations in which the reliable information is determined but is never requested.

In general, techniques for determining reliable information from the data values provided by the wardens 112A-N during the asynchronous process 600 can be similar to the techniques described with respect to the synchronous process 400 (shown in FIG. 4). For example, the enclave 110 can determine a number of wardens that are currently collecting off-chain data values, and a number of wardens that have provided current data values (or that have at least provided a notification of activity) within a designated time window (e.g., a most recent five seconds, ten seconds, twenty seconds, or another appropriate time window). If a designated number of wardens are active and have previously provided data values (e.g., a number of wardens that corresponds to a threshold percentage, such as 50% of the wardens, 60% of the wardens, 80% of the wardens, or another appropriate threshold percentage), the enclave 110 can determine the reliable information from the data values that have been provided by those wardens. If the designated number of wardens are not active and/or have not provided data values, for example, the enclave 110 can indicate that reliable information is not available for a current period. If one or more wardens have become inactive (e.g., the wardens have not recently provided any data values or notifications of activity), the enclave 110 can potentially terminate communications with those wardens and establish communications with other wardens, and can provide the general request to perform the data collection task to the other wardens. As described with respect to the synchronous process 400, for example, determining reliable information from data values received from wardens can include determining whether a sufficient number of the received data values are in conformance, and can include determining an average, mean, or mode of the received data values. Also, outlier values can be similarly discarded, for example, and the wardens that have provided such values can be flagged for possible removal from a group of wardens from which the enclave 110 receives off-chain data values.

The collecting, providing, receiving, and storing of off-chain data values can continue until such time that the enclave 110 of the oracle 108 provides instructions to end the off-chain data collection process. Occasionally, operation of the enclave 110 may be interrupted, and on re-start, the enclave 110 can provide instructions to each of the wardens 112A-N to resend the most recently collect data values so that the enclave 110 can again determine reliable consensus information from the collected data values. Similar to the synchronous process 400, for example, after reliable information is received by an information consumer device (e.g., the blockchain 104, the information consumer server 104N, or another device that receives reliable information from the enclave 110), the reliable information can be used for executing smart contracts, for use as triggers and/or parameters for an online process, or for another technical use that causes a change in a computing environment.

In either synchronous, asynchronous, or hybrid processes (with both synchronous and asynchronous features), reliability and/or timeliness metrics can be assigned to wardens. In general, different wardens may be maintained differently, experience different network conditions, or may experience other technical conditions that affects performance and uptime. Further, since the data collection code each of the wardens 112A-N in asynchronous process 600 differs, the reliability and/or the timeliness of the wardens may also differ. In some implementations, reliability and/or timeliness metrics can be tracked for each of the wardens that provides off-chain data values. For example, the enclave 110 can track when the data values are received from each of the wardens 112A-N, and can assign positive metrics to a warden when the warden has consistently provided, sooner than other data wardens, data values that are later determined to be accurate data values, and thus are determined to be reliable information. For example, the warden 112A can receive off-chain data from a particular data source (e.g., data source 150A) that is particularly prompt and accurate when providing off-chain data, and/or the data collection code B1 of the warden 112A can be more effective at collecting and providing accurate off-chain data than the data collection code of other wardens. In the present example, the enclave 110 can assign positive reliability and/or timeliness metrics to warden 112A. As another example, if any of the wardens have consistently provided inaccurate data values and/or the data values are consistently provided later than other data wardens, the enclave 110 can assign negative reliability and/or timeliness metrics to such wardens. As another example, if any of the wardens are consistently off-line or inactive, the enclave 110 can assign negative reliability and/or timeliness metrics to such wardens. Wardens that consistently achieve positive reliability and/or timeliness metrics can be compensated (e.g., through the receipt of blockchain network tokens), whereas wardens that do not achieve positive reliability and/or timeliness metrics can optionally be removed from a warden pool.

Although the example synchronous process 400 and the example asynchronous process 600 (and their respective example computing environments) are described herein as separate examples, it is understood that some processes may be a hybrid that combines features of each process/environment. For example, a hybrid process/environment can include the providing of periodic polling instructions by an enclave (FIG. 3A, stage (A)), and the differing data collection code of the wardens (e.g., as shown in FIGS. 5A-C). As another example, a hybrid process/environment can include the uniform data collection code of the wardens (e.g., as shown in FIGS. 3A-B), and the information caching of the enclave (FIG. 5A, stage (C), and FIG. 5B, stage (E)). Other combinations of features from the examples described with respect to the processes 400 and 600 are possible.

Figure 7:
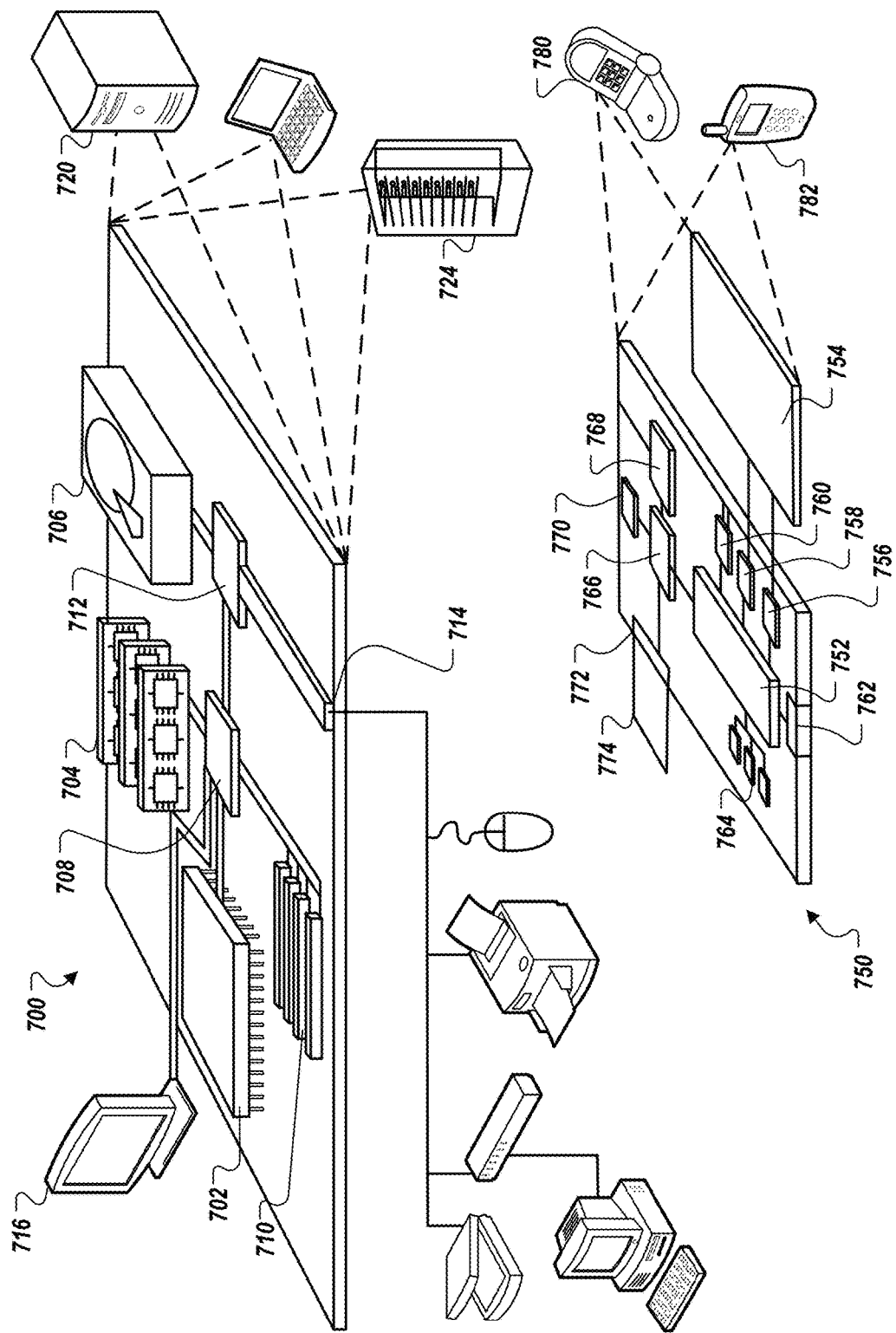
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provided as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

Example embodiments include:

1. A system for providing trustworthy consensus information based on data from distributed data sources, the system comprising:

a secure execution server comprising one or more processors and memory, the memory storing an oracle program, wherein the one or more processors and the memory provide a secure execution environment that, when the oracle program is executed by the one or more processors in the secure execution environment, is configured to interact with a pool of warden servers to determine trustworthy consensus information, the oracle program comprising instructions stored in the memory that, when executed by the secure execution environment, cause the secure-execution server to perform operations comprising:
  providing, to each warden of a group of wardens, a respective request for off-chain data;
  after providing the requests for off-chain data, receiving, from one or more wardens of the group of wardens, one or more off-chain data values that correspond to the requests for off-chain data;
  after a designated time window has elapsed for receiving off-chain data from wardens of the group of wardens, determining a number of wardens from which the one or more off-chain data values have been received;
  in response to determining that the number of wardens meets a threshold number of wardens, determining reliable consensus information from the one or more off-chain data values that have been received from wardens of the group of wardens; and
  providing the reliable consensus information to a computing device that is external to the secure execution environment.

2. The system of embodiment 1, the operations further comprising:
  receiving, from the computing device that is external to the secure execution environment, a request for reliable consensus information, wherein the respective requests for off-chain data are provided to each warden of the group of wardens in response to receiving the request for the reliable consensus information.

3. The system of any of embodiments 2, wherein the computing device that is external to the secure execution environment is a node in a blockchain network that is executing a smart contract.

4. The system of any of embodiments 1-3, wherein the respective requests for off-chain data are provided to each warden of the group of wardens in response to a periodic event received from a system timer.

5. The system of any of embodiments 1-4, wherein the respective requests for off-chain data are provided to each warden substantially simultaneously.

6. The system of any of embodiments 1-5, wherein the respective requests for off-chain data each specify one or more same data sources from which each warden is to collect off-chain data, and wherein each warden is configured to execute the same data collection code.

7. The system of any of embodiments 1-6, wherein determining the reliable consensus information is performed in response to determining that a sufficient number of the one or more off-chain data values received from wardens of the group of wardens are in conformance.

8. The system of any of embodiments 1-7, wherein determining the reliable consensus information includes determining outlier values from among the one or more off-chain data values received from wardens of the group of wardens, and discarding the outlier values.

9. The system of any of embodiments 1-8, the operations further comprising:
  removing, from the group of wardens, one or more wardens that have provided the outlier values.

10. The system of any of embodiments 1-9, wherein at least a portion of the one or more off-chain data values are received directly by the secure-execution server from one or more external data sources.

11. The system of any of embodiments 1-10, the operations further comprising:
  generating and providing, in response to a remote attestation challenge, one or more validation values generated based on at least a portion of the oracle program stored in the memory of the secure execution server, wherein the one or more validation values are used by another computing device to validate that the oracle program is authentic and unmodified.

12. A system for providing trustworthy consensus information based on data from distributed data sources, the system comprising:
  a secure execution server comprising one or more processors and memory, the memory storing an oracle program, wherein the one or more processors and the memory provide a secure execution environment that, when the oracle program is executed by the one or more processors in the secure execution environment, is configured to interact with a pool of warden servers to determine trustworthy consensus information, the oracle program comprising instructions stored in the memory that, when executed by the secure execution environment, cause the secure-execution server to perform operations comprising:
    asynchronously receiving, from wardens of a group of wardens, one or more off-chain data values that have been collected by each of the wardens from one or more off-chain data sources;
    after receiving each of the off-chain data values from each of the wardens, storing the off-chain data values received from the warden;
    determining reliable consensus information from the stored off-chain data values, by (i) determining a number of active wardens from which off-chain data values have been received, and (ii) in response to determining that the number of active wardens meets a threshold number of wardens, determining reliable consensus information from the stored off-chain data values that have been received from the active wardens; and
    providing the reliable consensus information to a computing device that is external to the secure execution environment.

13. The system of embodiment 12, wherein the off-chain data values that have been collected by each of the wardens are received from each warden of the group of wardens in a common data format that is used by the secure execution server for receiving data.

14. The system of any of embodiments 12-13, wherein at least two of the wardens are configured to collect off-chain data values from different data sources, and wherein the at least two of the wardens are configured to execute different data collection code.

15. The system of any of embodiments 12-14, wherein each warden of the group of wardens is configured to provide an updated off-chain data value in response to detecting a change in the off-chain data value.

16. The system of any of embodiments 15, wherein determining reliable consensus information is performed in response to receiving the updated off-chain data value from a given warden.

17. The system of any of embodiments 12-16, wherein determining reliable consensus information is repeatedly performed at periodic intervals, independently of a request for the reliable consensus information.

18. The system of any of embodiments 12-17, the operations further comprising:
receiving, from the computing device that is external to the secure execution environment, a request for reliable consensus information, wherein determining reliable consensus information is performed in response to receiving the request.

19. The system of any of embodiments 12-18, the operations further comprising:
providing, to each warden of the group of wardens, a respective request to resend the most recently collected off-chain data; and
after providing the requests to resend the most recently collected off-chain data, receiving, from one or more wardens of the group of wardens, one or more off-chain data values that correspond to the requests.

20. The system of any of embodiments 12-19, the operations further comprising:
for each warden of the group of wardens, tracking a corresponding reliability metric, by (i) assigning a positive metric value to a given warden when the warden has provided, sooner than other wardens, an off-chain data value that is later determined as reliable consensus information.

21. The system of any of embodiments 12-20, wherein at least a portion of the one or more off-chain data values are received directly by the secure-execution server from one or more external data sources.

22. The system of any of embodiments 12-21, the operations further comprising:
generating and providing, in response to a remote attestation challenge, one or more validation values generated based on at least a portion of the oracle program stored in the memory of the secure execution server, wherein the one or more validation values are used by another computing device to validate that the oracle program is authentic and unmodified.

What is claimed is:

1. A system for providing trustworthy consensus information based on data from distributed data sources, the system comprising:
a secure execution server comprising one or more processors and memory, the memory storing an oracle program, wherein the one or more processors and the memory provide a secure execution environment that, when the oracle program is executed by the one or more processors in the secure execution environment, is configured to interact with a pool of warden servers to determine trustworthy consensus information, the oracle program comprising instructions stored in the memory that, when executed by the secure execution environment, cause the secure-execution server to perform operations comprising:
providing, to each warden of a group of wardens, a respective request for off-chain data;
after providing the requests for off-chain data, receiving, from one or more wardens of the group of wardens, one or more off-chain data values that correspond to the requests for off-chain data;
after a designated time window has elapsed for receiving off-chain data from wardens of the group of wardens, determining a number of wardens from which the one or more off-chain data values have been received;
in response to determining that the number of wardens meets a threshold number of wardens, determining reliable consensus information from the one or more off-chain data values that have been received from wardens of the group of wardens; and
providing the reliable consensus information to a computing device that is external to the secure execution environment.

2. The system of claim 1, the operations further comprising:
receiving, from the computing device that is external to the secure execution environment, a request for reliable consensus information, wherein the respective requests for off-chain data are provided to each warden of the group of wardens in response to receiving the request for the reliable consensus information.

3. The system of claim 2, wherein the computing device that is external to the secure execution environment is a node in a blockchain network that is executing a smart contract.

4. The system of claim 1, wherein the respective requests for off-chain data are provided to each warden of the group of wardens in response to a periodic event received from a system timer.

5. The system of claim 1, wherein the respective requests for off-chain data are provided to each warden substantially simultaneously.

6. The system of claim 1, wherein the respective requests for off-chain data each specify one or more same data sources from which each warden is to collect off-chain data, and wherein each warden is configured to execute the same data collection code.

7. The system of claim 1, wherein determining the reliable consensus information is performed in response to determining that a sufficient number of the one or more off-chain data values received from wardens of the group of wardens are in conformance.

8. The system of claim 1, wherein determining the reliable consensus information includes determining outlier values from among the one or more off-chain data values received from wardens of the group of wardens, and discarding the outlier values.

9. The system of claim 1, the operations further comprising:
removing, from the group of wardens, one or more wardens that have provided the outlier values.

10. The system of claim 1, wherein at least a portion of the one or more off-chain data values are received directly by the secure-execution server from one or more external data sources.

11. The system of claim 1, the operations further comprising:
generating and providing, in response to a remote attestation challenge, one or more validation values generated based on at least a portion of the oracle program stored in the memory of the secure execution server, wherein the one or more validation values are used by another computing device to validate that the oracle program is authentic and unmodified.

12. A system for providing trustworthy consensus information based on data from distributed data sources, the system comprising:
a secure execution server comprising one or more processors and memory, the memory storing an oracle program, wherein the one or more processors and the memory provide a secure execution environment that, when the oracle program is executed by the one or more processors in the secure execution environment, is configured to interact with a pool of warden servers to determine trustworthy consensus information, the oracle program comprising instructions stored in the memory that, when executed by the secure execution environment, cause the secure-execution server to perform operations comprising:
- asynchronously receiving, from wardens of a group of wardens, one or more off-chain data values that have been collected by each of the wardens from one or more off-chain data sources;
- after receiving each of the off-chain data values from each of the wardens, storing the off-chain data values received from the warden;
- determining reliable consensus information from the stored off-chain data values, by (i) determining a number of active wardens from which off-chain data values have been received, and (ii) in response to determining that the number of active wardens meets a threshold number of wardens, determining reliable consensus information from the stored off-chain data values that have been received from the active wardens; and
- providing the reliable consensus information to a computing device that is external to the secure execution environment.

13. The system of claim 12, wherein the off-chain data values that have been collected by each of the wardens are received from each warden of the group of wardens in a common data format that is used by the secure execution server for receiving data.

14. The system of claim 12, wherein at least two of the wardens are configured to collect off-chain data values from different data sources, and wherein the at least two of the wardens are configured to execute different data collection code.

15. The system of claim 12, wherein each warden of the group of wardens is configured to provide an updated off-chain data value in response to detecting a change in the off-chain data value.

16. The system of claim 15, wherein determining reliable consensus information is performed in response to receiving the updated off-chain data value from a given warden.

17. The system of claim 12, wherein determining reliable consensus information is repeatedly performed at periodic intervals, independently of a request for the reliable consensus information.

18. The system of claim 12, the operations further comprising:
- receiving, from the computing device that is external to the secure execution environment, a request for reliable consensus information, wherein determining reliable consensus information is performed in response to receiving the request.

19. The system of claim 12, the operations further comprising:
- providing, to each warden of the group of wardens, a respective request to resend the most recently collected off-chain data; and
- after providing the requests to resend the most recently collected off-chain data, receiving, from one or more wardens of the group of wardens, one or more off-chain data values that correspond to the requests.

20. The system of claim 12, the operations further comprising:
- for each warden of the group of wardens, tracking a corresponding reliability metric, by (i) assigning a positive metric value to a given warden when the warden has provided, sooner than other wardens, an off-chain data value that is later determined as reliable consensus information.

21. The system of claim 12, wherein at least a portion of the one or more off-chain data values are received directly by the secure-execution server from one or more external data sources.

22. The system of claim 12, the operations further comprising:
- generating and providing, in response to a remote attestation challenge, one or more validation values generated based on at least a portion of the oracle program stored in the memory of the secure execution server, wherein the one or more validation values are used by another computing device to validate that the oracle program is authentic and unmodified.

* * * * *